(12) United States Patent
Glasgow et al.

(10) Patent No.: US 7,812,078 B2
(45) Date of Patent: Oct. 12, 2010

(54) IONIZING RADIATION STABLE THERMOPLASTIC COMPOSITION, METHOD OF MAKING, AND ARTICLES FORMED THEREFROM

(75) Inventors: Katherine Glasgow, Evansville, IN (US); Brian Mullen, Mt. Vernon, IN (US); Philippe Schottland, West Chester, OH (US)

(73) Assignee: Sabic Innovative Plastics IP B.V. (NL)

( * ) Notice: Subject to any disclaimer, the term of this patent is extended or adjusted under 35 U.S.C. 154(b) by 1328 days.

(21) Appl. No.: 11/263,325

(22) Filed: Oct. 31, 2005

(65) Prior Publication Data

US 2007/0100038 A1    May 3, 2007

(51) Int. Cl.
C08K 5/42    (2006.01)
(52) U.S. Cl. ........................... 524/157; 524/158
(58) Field of Classification Search .............. 524/157, 524/158
See application file for complete search history.

(56) References Cited

U.S. PATENT DOCUMENTS

| | | | |
|---|---|---|---|
| 4,760,107 A | 7/1988 | Nelson | 524/114 |
| 4,873,279 A | 10/1989 | Nelson | 524/384 |
| 4,880,850 A | 11/1989 | Nelson et al. | |
| 4,996,244 A | 2/1991 | Avakian | |
| 4,996,248 A | 2/1991 | Nelson et al. | |
| 5,274,009 A | 12/1993 | Grigo et al. | 523/137 |
| 5,486,555 A | 1/1996 | Hirata et al. | 524/83 |
| 5,635,441 A | 6/1997 | Sam et al. | |
| 5,807,908 A | 9/1998 | Hirose et al. | 523/136 |
| 6,040,367 A * | 3/2000 | Miya et al. | 524/107 |
| 6,107,375 A * | 8/2000 | Krishnan et al. | 524/95 |
| 6,297,300 B1 | 10/2001 | Van Nuffel | 524/91 |
| 2005/0113535 A1 | 5/2005 | Glasgow et al. | |
| 2005/0288407 A1 | 12/2005 | Heuer et al. | 524/155 |
| 2006/0013849 A1 | 1/2006 | Strickler et al. | 424/422 |
| 2006/0072444 A1* | 4/2006 | Engel et al. | 369/275.1 |

FOREIGN PATENT DOCUMENTS

| | | |
|---|---|---|
| EP | 0 152 012 A2 | 1/1985 |
| EP | 0 272 416 A2 | 11/1987 |
| EP | 0 272 417 A2 | 11/1987 |
| EP | 0 384 110 B1 | 1/1990 |
| EP | 0 535 464 B1 | 9/1992 |
| EP | 0535464 B1 | 9/1992 |
| EP | 0525338 | 2/1993 |
| EP | 0 640 646 A1 | 8/1994 |
| EP | 0 640 646 B1 | 8/1994 |
| EP | 1 221 459 A1 | 8/1994 |
| EP | 0 664 316 A1 | 1/1995 |
| EP | 0 753 540 A2 | 7/1996 |
| EP | 0 753 540 B1 | 7/1996 |
| EP | 0753540 A2 | 7/1996 |
| EP | 0 787 769 B1 | 1/1997 |
| EP | 0 794 218 A2 | 3/1997 |
| EP | 0 794 218 B1 | 3/1997 |
| EP | 0 970 996 B1 | 7/1998 |
| WO | WO 01/90233 A1 | 11/2001 |
| WO | WO 01/90244 A1 | 11/2001 |

OTHER PUBLICATIONS

JP9003314. Publication Date: Jan. 7, 1997. "Polycarbonate Resin Composition". (Abstract Only).
JP9040854. Publication Date: Feb. 10, 1997. "Polycarbonate Resin Composition". (Abstract Only).
JP9143354. Publication Date: Jun. 3, 1997. "Polycarbonate Resin Composition". (Abstract Only).
JP9143355. Publication Date: Jun. 3, 1997. "Polycarbonate Resin Composition". (Abstract Only).
JP1978-64262. Publication Date: Jun. 8, 1978: "Method of Stabilizing Polycarbonat Resin" (Abstract Only).
JP9255861. Publication Date: Sep. 30, 1997 "Polycarbonate Resin Composition". (Abstract Only).
JP9296104. Publication Date: Nov. 18, 1997. "Polycarbonate Resin Composition". (Abstract Only).
JP9310010. Publication Date: Dec. 2, 1997. Polycarbonate Resin Composition (Abstract Only).
JP2001207064. Publication Date: Jul. 31, 2001. "Thermoplastic Resin Composition". (Abstract Only).
JP2001279085. Publication Date: Oct. 10, 2001. "Thermoplastic Resin Composition, Thermoplastic Resin Molded Product and Part for Medical Care". (Abstract Only).

(Continued)

Primary Examiner—Edward J Cain
(74) Attorney, Agent, or Firm—Cantor Colburn LLP

(57) ABSTRACT

A thermoplastic composition comprises a polycarbonate, and an aromatic sulfonate compound of formula $$(Y)_m\text{—Ar—}(Z\text{—S(O)}_2\text{—X})_n$$

wherein each X is independently a substituted or unsubstituted $C_1\text{-}C_{20}$ alkyl, substituted or unsubstituted $C_1\text{-}C_{20}$ arylalkyl, substituted or unsubstituted $C_6\text{-}C_{20}$ aryl, or substituted or unsubstituted $C_7\text{-}C_{40}$ alkylaryl; Z is —O—, or substituted or unsubstituted —(O—$C_{1\text{-}20}$—)$_w$—O—, wherein w is 1 to 20; Ar is a $C_6\text{-}C_{62}$ aromatic group; m is 0-3 and n is 3-6; and each Y is independently $C_1\text{-}C_{20}$ alkyl, substituted $C_1\text{-}C_{20}$ alkyl, $C_6\text{-}C_{20}$ aryl, $C_1\text{-}C_8$ alkyl-substituted $C_6\text{-}C_{20}$ aryl, halogen, nitro, $C_1\text{-}C_{20}$ alkoxycarbonyl, $C_1\text{-}C_{20}$ alkoxy, or $C_1\text{-}C_{20}$ acyl, and further wherein a molded article having a thickness of 3.2±0.12 millimeters and consisting of the polycarbonate, aromatic sulfonate compound, and an effective amount of each of a mold-release agent and an antioxidant has, after exposure to a total gamma radiation dose of 83 kGy and when measured according to ASTM D1925-70, an increase in yellowness index (dYI) of less than or equal to 45, when compared to the unexposed molded article. Methods of making the thermoplastic composition, and articles prepared therefrom, are also disclosed.

24 Claims, No Drawings

OTHER PUBLICATIONS

Tachikawa, et al. "Development of Polymer Films Containing Tris-(sulfonyloxy)benzene Analogs for Y Rays Detection". Journal of Photopolymer Science and Technology. vol. 17, No. 1 (2004). pp. 81-86.

Japanese Publication No. 63051429, published Mar. 4, 1988, Abstract Only, 1 page.

ASTM D1925-70 (Reapproved 1988) "Standard Test Method for Yellowness Index of Plastics" pp. 1-3, (1988).

ASTM D1003-00 "Standard Test Method for Haze and Luminous Transmittance of Transparent Plastics" pp. 1-6, (2000).

JP9003314. "Polycarbonate Resin Composition" Published Jan. 7, 1997. Abstrat Only.

* cited by examiner

IONIZING RADIATION STABLE THERMOPLASTIC COMPOSITION, METHOD OF MAKING, AND ARTICLES FORMED THEREFROM

BACKGROUND OF THE INVENTION

This disclosure relates to stabilized thermoplastic compositions, methods of manufacture, and articles and uses thereof.

Irradiation using electron beam (e-beam) radiation or gamma ray (γ-ray) radiation (also referred to as "gamma radiation") is increasingly used to sterilize lightweight or disposable plastic articles for use in hospitals, biological laboratories, manufacturers of medical devices, and other end-users of sterile equipment. Gamma ray sources such as, for example, $^{60}$Co, which emits a β-particle and gamma ray radiation at 1.17 and 1.33 megaelectron volts (MeV), can be used for sterilization. Some advantages of gamma ray radiation are that it is more penetrating than E-beam radiation, leaves no residue, and can be less damaging to plastics than heat and/or moisture. Because of the ability of gamma rays to penetrate plastics, articles that have already been packaged and/or assembled may conveniently be sterilized. Further, use of such radiation is ideal for sterilizing large numbers of articles, such as those made from plastics, due to the penetrating ability of gamma radiation, wherein the units closer to the source can receive a similar dose to those furthest from the source. Articles such as blood bags, petri dishes, syringes, beakers, vials, centrifuge tubes, spatulas, and the like, as well as prepackaged articles, are desirably sterilized using this method.

Thermoplastics are useful for preparing articles such as those listed above. In particular, polycarbonates, with their balance of properties including transparency, low color, impact resistance, ductility, and melt flow, are desirable for use as materials of construction. However, exposure of polycarbonates to gamma ray doses suitable for sterilization (typically nominal doses of 10 to 85 kiloGrays (kGy), where 1 Gray equals 1 Joule of absorbed energy per kilogram of mass) can result in observable yellowing of the polycarbonate, and may further result in the degradation of one or more mechanical properties. Colorants may be added in order to offset the yellowness resulting from sterilization of polycarbonate compositions. However, because the amount of colorant added to the polycarbonate is often selected for a given radiation dose, exposure dose variations due to process variability or re-sterilization can create color differences that may be noticeable to the eye.

Stabilizers, also referred to in the art as "antirads", may be used to mitigate the effects of the gamma ray dose on plastics generally. Stabilizers present in amounts sufficient to reduce yellowing in thermoplastic compositions comprising polycarbonates may also affect one or more of the desirable mechanical properties of the thermoplastic composition, such as, for example, impact strength and/or ductility. The usefulness of stabilizers to reduce yellowing in thermoplastic compositions of polycarbonate upon gamma ray exposure can, in this way, be mitigated by these secondary considerations of mechanical properties.

There accordingly remains a need in the art for improved stabilizers for polycarbonate compositions, as well as polycarbonate compositions having improved resistance to gamma ray radiation.

SUMMARY OF THE INVENTION

The above deficiencies in the art are alleviated by, in an embodiment, a thermoplastic composition comprising a polycarbonate, and an aromatic sulfonate compound of formula:

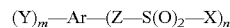
$$(Y)_m\text{—Ar—}(Z\text{—}S(O)_2\text{—}X)_n$$

wherein each X is independently a substituted or unsubstituted $C_1$-$C_{20}$ alkyl, substituted or unsubstituted $C_1$-$C_{20}$ arylalkyl, substituted or unsubstituted $C_6$-$C_{20}$ aryl, or substituted or unsubstituted $C_7$-$C_{40}$ alkylaryl; Z is —O—, or substituted or unsubstituted —(O—$C_{1\text{-}20}$—)$_w$—O—, wherein w is 1 to 20; Ar is a $C_6$-$C_{62}$ aromatic group; m is 0-3 and n is 3-6; and each Y is independently $C_1$-$C_{20}$ alkyl, substituted $C_1$-$C_{20}$ alkyl, $C_6$-$C_{20}$ aryl, $C_1$-$C_8$ alkyl-substituted $C_6$-$C_{20}$ aryl, halogen, nitro, $C_1$-$C_{20}$ alkoxycarbonyl, $C_1$-$C_{20}$ alkoxy, or $C_1$-$C_{20}$ acyl, and further wherein a molded article having a thickness of 3.2±0.12 millimeters and consisting of the polycarbonate, aromatic sulfonate compound, and an effective amount of each of a mold-release agent and an antioxidant has, after exposure to a total gamma radiation dose of 83 kGy and when measured according to ASTM D1925-70, an increase in yellowness index (dYI) of less than or equal to 45, when compared to the unexposed molded article.

In another embodiment, a thermoplastic composition comprises a polycarbonate, and 0.001 to 500 millimoles per kilogram (mmol/Kg) of an aromatic sulfonate compound of formula

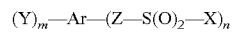
$$(Y)_m\text{—Ar—}(Z\text{—}S(O)_2\text{—}X)_n$$

wherein each X is independently a substituted or unsubstituted $C_1$-$C_{20}$ alkyl, substituted or unsubstituted $C_1$-$C_{20}$ arylalkyl, substituted or unsubstituted $C_6$-$C_{20}$ aryl, or substituted or unsubstituted $C_7$-$C_{40}$ alkylaryl; Z is —O—, or substituted or unsubstituted —(O—$C_{1\text{-}20}$—)$_w$—O—, wherein w is 1 to 20; Ar is a $C_6$-$C_{62}$ aromatic group; m is 0-3 and n is 3-6; and each Y is independently $C_1$-$C_{20}$ alkyl, substituted $C_1$-$C_{20}$ alkyl, $C_6$-$C_{20}$ aryl, $C_1$-$C_8$ alkyl-substituted $C_6$-$C_{20}$ aryl, halogen, nitro, $C_1$-$C_{20}$ alkoxycarbonyl, $C_1$-$C_{20}$ alkoxy, or $C_1$-$C_{20}$ acyl, wherein the amount of aromatic sulfonate compound is based on the total weight of the polycarbonate and aromatic sulfonate compound.

In another embodiment, a method of forming a thermoplastic composition comprises melt blending a polycarbonate and an aromatic sulfonate compound of formula:

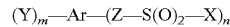
$$(Y)_m\text{—Ar—}(Z\text{—}S(O)_2\text{—}X)_n$$

wherein each X is independently a substituted or unsubstituted $C_1$-$C_{20}$ alkyl, substituted or unsubstituted $C_1$-$C_{20}$ arylalkyl, substituted or unsubstituted $C_6$-$C_{20}$ aryl, or substituted or unsubstituted $C_7$-$C_{40}$ alkylaryl; Z is —O—, or substituted or unsubstituted —(O—$C_{1\text{-}20}$—)$_w$—O—, wherein w is 1 to 20; Ar is a $C_6$-$C_{62}$ aromatic group; m is 0-3 and n is 3-6; and each Y is independently $C_1$-$C_{20}$ alkyl, substituted $C_1$-$C_{20}$ alkyl, $C_6$-$C_{20}$ aryl, $C_1$-$C_8$ alkyl-substituted $C_6$-$C_{20}$ aryl, halogen, nitro, $C_1$-$C_{20}$ alkoxycarbonyl, $C_1$-$C_{20}$ alkoxy, or $C_1$-$C_{20}$ acyl, and further wherein a molded article having a thickness of 3.2±0.12 millimeters and consisting of the polycarbonate, aromatic sulfonate compound, and an effective amount of each of a mold-release agent and an antioxidant has, after exposure to a total gamma radiation dose of 83 kGy and when measured according to ASTM D1925-70, an increase in yellowness index (dYI) of less than or equal to 45, when compared to the unexposed molded article.

In another embodiment, a masterbatch composition comprises a polycarbonate, and 5 to 500 mmol/Kg of an aromatic sulfonate compound of formula:

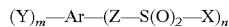

$(Y)_m$—Ar—$(Z—S(O)_2—X)_n$ wherein each X is independently a substituted or unsubstituted $C_1$-$C_{20}$ alkyl, substituted or unsubstituted $C_1$-$C_{20}$ arylalkyl, substituted or unsubstituted $C_6$-$C_{20}$ aryl, or substituted or unsubstituted $C_7$-$C_{40}$ alkylaryl; Z is —O—, or substituted or unsubstituted —(O—$C_{1-20}$—)$_w$—O—, wherein w is 1 to 20; Ar is a $C_6$-$C_{62}$ aromatic group; m is 0-3 and n is 3-6; and each Y is independently $C_1$-$C_{20}$ alkyl, substituted $C_1$-$C_{20}$ alkyl, $C_6$-$C_{20}$ aryl, $C_1$-$C_8$ alkyl-substituted $C_6$-$C_{20}$ aryl, halogen, nitro, $C_1$-$C_{20}$ alkoxycarbonyl, $C_1$-$C_{20}$ alkoxy, or $C_1$-$C_{20}$ acyl, wherein the amount of aromatic sulfonate compound is based on the total weight of the polycarbonate and aromatic sulfonate compound, and wherein a thermoplastic composition comprises a masterbatch composition and a polycarbonate resin.

In another embodiment, a method of making a thermoplastic composition comprises melt-blending: a masterbatch composition comprising a polycarbonate, and an aromatic sulfonate compound of formula:

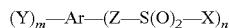

$(Y)_m$—Ar—$(Z—S(O)_2—X)_n$ wherein each X is independently a substituted or unsubstituted $C_1$-$C_{20}$ alkyl, substituted or unsubstituted $C_1$-$C_{20}$ arylalkyl, substituted or unsubstituted $C_6$-$C_{20}$ aryl, or substituted or unsubstituted $C_7$-$C_{40}$ alkylaryl, Z is —O— or substituted or unsubstituted —(O—$C_{1-20}$—)$_w$—O—, wherein w is 1 to 20, Ar is a $C_6$-$C_{62}$ aromatic group, m is 0-3 and n is 3-6, and each Y is independently $C_1$-$C_{20}$ alkyl, substituted $C_1$-$C_{20}$ alkyl, $C_6$-$C_{20}$ aryl, $C_1$-$C_8$ alkyl-substituted $C_6$-$C_{20}$ aryl, halogen, nitro, $C_1$-$C_{20}$ alkoxycarbonyl, $C_1$-$C_{20}$ alkoxy, or $C_1$-$C_{20}$ acyl; and a polycarbonate resin, and wherein a molded article having a thickness of 3.2±0.12 millimeters and consisting of the polycarbonate, aromatic sulfonate compound, the polycarbonate resin, and an effective amount of each of a mold-release agent and an antioxidant has, after exposure to a total gamma radiation dose of 83 kGy and when measured according to ASTM D1925-70, an increase in yellowness index (dYI) of less than or equal to 45, when compared to the unexposed molded article.

In another embodiment, an article comprising the thermoplastic composition is disclosed.

The above described and other features are exemplified by the following detailed description.

DETAILED DESCRIPTION OF THE INVENTION

Surprisingly, it has been found that a thermoplastic composition comprising a polycarbonate, a specific type of aromatic sulfonate compound, and an optional ionizing radiation stabilizing additive has significantly improved resistance to yellowing upon exposure to gamma radiation. The aromatic sulfonate compound is advantageously present in an amount that is lower than an amount of other known stabilizers needed to afford a comparable resistance to yellowing after gamma radiation exposure in a comparable polycarbonate-containing composition. The use of the aromatic sulfonate compound helps maintain the mechanical properties at the same or comparable level as an unstabilized thermoplastic composition comprising polycarbonate.

As used herein, the term "alkyl" refers to a straight or branched chain monovalent hydrocarbon group; "alkylene" refers to a straight or branched chain divalent hydrocarbon group; "alkylidene" refers to a straight or branched chain divalent hydrocarbon group, with both valences on a single common carbon atom; "alkenyl" refers to a straight or branched chain monovalent hydrocarbon group having at least two carbons joined by a carbon-carbon double bond; "cycloalkyl" refers to a non-aromatic monovalent monocyclic or multicylic hydrocarbon group having at least three carbon atoms, "cycloalkylene" refers to a non-aromatic alicyclic divalent hydrocarbon group having at least three carbon atoms, with at least one degree of unsaturation; "aryl" refers to an aromatic monovalent group containing only carbon in the aromatic ring or rings; "arylene" refers to an aromatic divalent group containing only carbon in the aromatic ring or rings; "alkylaryl" refers to an aryl group that has been substituted with an alkyl group as defined above, with 4-methylphenyl being an exemplary alkylaryl group; "arylalkyl" refers to an alkyl group that has been substituted with an aryl group as defined above, with benzyl being an exemplary arylalkyl group; "acyl" refers to a an alkyl group as defined above with the indicated number of carbon atoms attached through a carbonyl carbon bridge (—C(=O)—); "alkoxy" refers to an alkyl group as defined above with the indicated number of carbon atoms attached through an oxygen bridge (—O—); and "aryloxy" refers to an aryl group as defined above with the indicated number of carbon atoms attached through an oxygen bridge (—O—).

Unless otherwise indicated, each of the foregoing groups may be unsubstituted or substituted, provided that the substitution does not significantly adversely affect synthesis, stability, or use of the compound. The term "substituted" as used herein means that any one or more hydrogens on the designated atom or group is replaced with another group, provided that the designated atom's normal valence is not exceeded. When the substituent is oxo (i.e., =O), then two hydrogens on the atom are replaced. Combinations of substituents and/or variables are permissible provided that the substitutions do not significantly adversely affect synthesis or use of the compound.

Exemplary groups that may be present on a "substituted" position include, but are not limited to, halogen; cyano; hydroxyl; nitro; azido; alkanoyl (such as a $C_2$-$C_6$ alkanoyl group such as acyl or the like); carboxamido; alkyl groups (typically having 1 to about 8 carbon atoms, or 1 to about 6 carbon atoms); cycloalkyl groups, alkenyl and alkynyl groups (including groups having one or more unsaturated linkages and from 2 to about 8, or 2 to about 6 carbon atoms); alkoxy groups having one or more oxygen linkages and from 1 to about 8, or from 1 to about 6 carbon atoms; aryloxy such as phenoxy; alkylthio groups including those having one or more thioether linkages and from 1 to about 8 carbon atoms, or from 1 to about 6 carbon atoms; alkylsulfinyl groups including those having one or more sulfinyl linkages and from 1 to about 8 carbon atoms, or from 1 to about 6 carbon atoms; alkylsulfonyl groups including those having one or more sulfonyl linkages and from 1 to about 8 carbon atoms, or from 1 to about 6 carbon atoms; aminoalkyl groups including groups having one or more N atoms and from 1 to about 8, or from 1 to about 6 carbon atoms; aryl having 6 or more carbons and one or more rings, (e.g., phenyl, biphenyl, naphthyl, or the like, each ring either substituted or unsubstituted aromatic); arylalkyl having 1 to 3 separate or fused rings and from 6 to about 18 ring carbon atoms, with benzyl being an exemplary arylalkyl group; or arylalkoxy having 1 to 3 separate or fused rings and from 6 to about 18 ring carbon atoms, with benzyloxy being an exemplary arylalkoxy group.

The thermoplastic composition comprises a polycarbonate. As used herein, the terms "polycarbonate" and "polycarbonate resin" means compositions having repeating structural carbonate units of the formula (1):

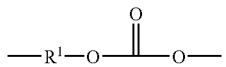  (1)

in which at least 60 percent of the total number of $R^1$ groups are aromatic organic radicals and the balance thereof are aliphatic, alicyclic, or aromatic radicals. In one embodiment, each $R^1$ is an aromatic organic radical, for example a radical of the formula (2):

  (2)

wherein each of $A^1$ and $A^2$ is a monocyclic divalent aryl radical and $Y^1$ is a bridging radical having one or two atoms that separate $A^1$ from $A^2$. In an exemplary embodiment, one atom separates $A^1$ from $A^2$. Illustrative non-limiting examples of radicals of this type are —O—, —S—, —S(O)—, —S(O$_2$)—, —C(O)—, methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ may be a hydrocarbon group or a saturated hydrocarbon group such as methylene, cyclohexylidene, or isopropylidene.

Polycarbonates may be produced by the interfacial reaction of dihydroxy compounds having the formula HO—$R^1$—OH, which includes dihydroxy compounds of formula (3)

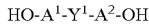  (3)

wherein $Y^1$, $A^1$ and $A^2$ are as described above. Also included are bisphenol compounds of general formula (4):

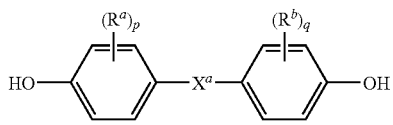  (4)

wherein $R^a$ and $R^b$ each represent a halogen atom or a monovalent hydrocarbon group and may be the same or different; p and q are each independently integers of 0 to 4; and $X^a$ represents one of the groups of formula (5):

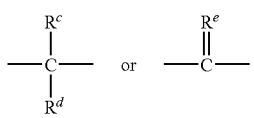  (5)

wherein $R^c$ and $R^d$ each independently represent a hydrogen atom or a monovalent linear or cyclic hydrocarbon group and $R^e$ is a divalent hydrocarbon group.

Some illustrative, non-limiting examples of suitable dihydroxy compounds include the following: resorcinol, 4-bromoresorcinol, hydroquinone, 4,4'-dihydroxybiphenyl, 1,6-dihydroxynaphthalene, 2,6-dihydroxynaphthalene, bis(4-hydroxyphenyl)methane, bis(4-hydroxyphenyl) diphenylmethane, bis(4-hydroxyphenyl)-1-naphthylmethane, 1,2-bis(4-hydroxyphenyl)ethane, 1,1-bis (4-hydroxyphenyl)-1-phenylethane, 2-(4-hydroxyphenyl)-2-(3-hydroxyphenyl)propane, bis(4-hydroxyphenyl) phenylmethane, 2,2-bis(4-hydroxy-3-bromophenyl) propane, 1,1-bis(hydroxyphenyl)cyclopentane, 1,1-bis(4-hydroxyphenyl)cyclohexane, 1,1-bis(4-hydroxy-3methyl phenyl)cyclohexane 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantine, (alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl) propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl) propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis (4-hydroxyphenyl)sulfone, 9,9-bis(4-hydroxyphenyl) fluorine, 2,7-dihydroxypyrene, 6,6'-dihydroxy-3,3,3', 3'-tetramethylspiro(bis)indane("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, and the like, as well as combinations comprising at least one of the foregoing dihydroxy compounds.

Specific examples of the types of bisphenol compounds represented by formula (3) include 1,1-bis(4-hydroxyphenyl) methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl) octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxy-t-butylphenyl)propane, 3,3-bis(4-hydroxyphenyl)phthalimidine, 2-phenyl-3,3-bis(4-hydroxyphenyl)phthalimidine (PPPBP), and 1,1-bis(4-hydroxy-3-methylphenyl)cyclohexane (DMBPC). Combinations comprising at least one of the foregoing dihydroxy compounds may also be used.

Branched polycarbonates are also useful, as well as blends of a linear polycarbonate and a branched polycarbonate. The branched polycarbonates may be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl)alpha, alpha-dimethyl benzyl)phenol), 4-chloroformyl phthalic anhydride, trimesic acid, and benzophenone tetracarboxylic acid.

The branching agents may be added at a level of 0.05 to 2.0 wt % of the polycarbonate. All types of polycarbonate end groups are contemplated as being useful in the polycarbonate, provided that such end groups do not significantly affect desired properties of the thermoplastic compositions.

In a specific embodiment, the polycarbonate is a linear homopolymer derived from bisphenol A, in which each of $A^1$ and $A^2$ is p-phenylene and $Y^1$ is isopropylidene. The polycarbonates may have an intrinsic viscosity, as determined in chloroform at 25° C., of 0.3 to 1.5 deciliters per gram (dl/g), specifically 0.45 to 1.0 dl/g. The polycarbonates may have a weight average molecular weight (Mw) of 10,000 to 100,000, as measured by gel permeation chromatography (GPC) using a crosslinked styrene-divinyl benzene column, at a sample concentration of 1 milligram per milliliter, and as calibrated with polycarbonate standards.

In an embodiment, the polycarbonate has flow properties suitable for the manufacture of thin articles. Melt volume flow rate (often abbreviated MVR) measures the rate of extrusion of a thermoplastics through an orifice at a prescribed temperature and load. Polycarbonates suitable for the formation of thin articles may have an MVR, measured at 300° C./1.2 kg according to ASTM D1238-04, of 0.5 to 80 cubic centimeters per 10 minutes (cc/10 min). In a specific embodiment, a suitable polycarbonate composition has an MVR measured at 300° C./1.2 kg according to ASTM D1238-04, of 0.5 to 50 cc/10 min, specifically 0.5 to 25 cc/10 min, and more specifically 1 to 15 cc/10 min. Mixtures of polycarbonates of different flow properties may be used to achieve the overall desired flow property.

The polycarbonate may have a light transmittance greater than or equal to 55%, specifically greater than or equal to 60% and more specifically greater than or equal to 70%, as measured at 3.2±0.12 millimeters thickness according to ASTM D1003-00. The polycarbonate may also have a haze less than or equal to 50%, specifically less than or equal to 40%, and most specifically less than or equal to 30%, as measured at 3.2±0.12 millimeters thickness according to ASTM DI 003-00.

"Polycarbonates" and "polycarbonate resin" as used also refers to copolymers comprising carbonate chain units. A specific suitable copolymer is a polyester-polycarbonate, also known as a copolyester-polycarbonate and polyester-carbonate. Combinations of polycarbonates and polyester-polycarbonates may also be used. As used herein, a "combination" is inclusive of all mixtures, blends, alloys, reaction products, and the like. Polyester-polycarbonates contain, in addition to recurring carbonate chain units of the formula (1), repeating units of formula (6):

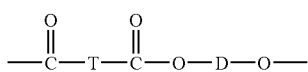

wherein D is a divalent radical derived from a dihydroxy compound, and may be, for example, a $C_{2-10}$ alkylene radical, a $C_{6-20}$ alicyclic radical, a $C_{6-20}$ aromatic radical or a polyoxyalkylene radical in which the alkylene groups contain 2 to 6 carbon atoms, specifically 2, 3, or 4 carbon atoms; and T divalent radical derived from a dicarboxylic acid, and may be, for example, a $C_{2-10}$ alkylene radical, a $C_{6-20}$ alicyclic radical, a $C_{6-20}$ alkyl aromatic radical, or a $C_{6-20}$ aromatic radical.

In one embodiment, D is a $C_{2-6}$ alkylene radical. In another embodiment, D is derived from an aromatic dihydroxy compound of formula (7):

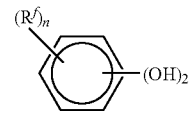

wherein each $R^f$ is independently a halogen atom, a $C_{1-10}$ hydrocarbon group, or a $C_{1-10}$ halogen substituted hydrocarbon group, and n is 0 to 4. The halogen is usually bromine. Examples of compounds that may be represented by the formula (7) include resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like; or combinations comprising at least one of the foregoing compounds.

Examples of aromatic dicarboxylic acids that may be used to prepare the polyesters include isophthalic or terephthalic acid, 1,2-di(p-carboxyphenyl)ethane, 4,4'-dicarboxydiphenyl ether, 4,4'-bisbenzoic acid, and mixtures comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or mixtures thereof. A specific dicarboxylic acid comprises a mixture of isophthalic acid and terephthalic acid wherein the weight ratio of terephthalic acid to isophthalic acid is 91:1 to 2:98. In another specific embodiment, D is a $C_{2-6}$ alkylene radical and T is p-phenylene, m-phenylene, naphthalene, a divalent cycloaliphatic radical, or a mixture thereof. This class of polyester includes the poly(alkylene terephthalates).

In addition to the ester units, the polyester-polycarbonates comprise carbonate units as described hereinabove. Carbonate units of formula (1) may also be derived from aromatic dihydroxy compounds of formula (7), wherein specific carbonate units are resorcinol carbonate units.

Specifically, the polyester unit of a polyester-polycarbonate can be derived from the reaction of a combination of isophthalic and terephthalic diacids (or derivatives thereof) with resorcinol, bisphenol A, or a combination comprising at least one of these, wherein the molar ratio of isophthalate units to terephthalate units is 91:9 to 2:98, specifically 85:15 to 3:97, more specifically 80:20 to 5:95, and still more specifically 70:30 to 10:90. The polycarbonate units can be derived from resorcinol and/or bisphenol A, in a molar ratio of resorcinol carbonate units to bisphenol A carbonate units of 0:100 to 99:1, and the molar ratio of the mixed isophthalate-terephthalate polyester units to the polycarbonate units in the polyester-polycarbonate can be 1:99 to 99:1, specifically 5:95 to 90:10, more specifically 10:90 to 80:20. Where a blend of polyester-polycarbonate with polycarbonate is used, the ratio of polycarbonate to polyester-polycarbonate in the blend can be, respectively, 1:99 to 99:1, specifically 10:90 to 90:10.

The polyester-polycarbonates may have a weight-averaged molecular weight (Mw) of 1,500 to 100,000, specifically 1,700 to 50,000, and more specifically 2,000 to 40,000.

Molecular weight determinations are performed using gel permeation chromatography (GPC), using a crosslinked styrene-divinylbenzene column and calibrated to polycarbonate references. Samples are prepared at a concentration of about 1 mg/ml, and are eluted at a flow rate of about 1.0 ml/min.

Suitable polycarbonates can be manufactured by processes such as interfacial polymerization and melt polymerization. Although the reaction conditions for interfacial polymerization may vary, an exemplary process generally involves dissolving or dispersing a dihydric phenol reactant in aqueous caustic soda or potash, adding the resulting mixture to a suitable water-immiscible solvent medium, and contacting the reactants with a carbonate precursor in the presence of a suitable catalyst such as triethylamine or a phase transfer catalyst, under controlled pH conditions, e.g., 8 to 10. The most commonly used water immiscible solvents include methylene chloride, 1,2-dichloroethane, chlorobenzene, toluene, and the like. Suitable carbonate precursors include, for example, a carbonyl halide such as carbonyl bromide or carbonyl chloride, or a haloformate such as a bishaloformates of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors may also be used. A chain stopper (also referred to as a capping agent) may be included during polymerization. The chain-stopper limits molecular weight growth rate, and so controls molecular weight in the polycarbonate. A chain-stopper may be at least one of mono-phenolic compounds, mono-carboxylic acid chlorides, and/or mono-chloroformates.

For example, mono-phenolic compounds suitable as chain stoppers include monocyclic phenols, such as phenol, $C_1$-$C_{22}$ alkyl-substituted phenols, p-cumyl-phenol, p-tertiary-butyl phenol, hydroxy diphenyl; monoethers of diphenols, such as p-methoxyphenol. Alkyl-substituted phenols include those with branched chain alkyl substituents having 8 to 9 carbon atoms. A mono-phenolic UV absorber may be used as capping agent. Such compounds include 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like. Specifically, mono-phenolic chain-stoppers include phenol, p-cumylphenol, and/or resorcinol monobenzoate.

Mono-carboxylic acid chlorides may also be suitable as chain stoppers. These include monocyclic, mono-carboxylic acid chlorides such as benzoyl chloride, $C_1$-$C_{22}$ alkyl-substituted benzoyl chloride, toluoyl chloride, halogen-substituted benzoyl chloride, bromobenzoyl chloride, cinnamoyl chloride, 4-nadimidobenzoyl chloride, and mixtures thereof; polycyclic, mono-carboxylic acid chlorides such as trimellitic anhydride chloride, and naphthoyl chloride; and mixtures of monocyclic and polycyclic mono-carboxylic acid chlorides. Chlorides of aliphatic monocarboxylic acids with up to 22 carbon atoms are suitable. Functionalized chlorides of aliphatic monocarboxylic acids, such as acryloyl chloride and methacryoyl chloride, are also suitable. Also suitable are mono-chloroformates including monocyclic, mono-chloroformates, such as phenyl chloroformate, alkyl-substituted phenyl chloroformate, p-cumyl phenyl chloroformate, toluene chloroformate, and mixtures thereof.

The polyester-polycarbonates may be prepared by interfacial polymerization. Rather than utilizing the dicarboxylic acid per se, it is possible, and sometimes even preferred, to employ the reactive derivatives of the acid, such as the corresponding acid halides, in particular the acid dichlorides and the acid dibromides. Thus, for example instead of using isophthalic acid, terephthalic acid, or mixtures thereof, it is possible to employ isophthaloyl dichloride, terephthaloyl dichloride, and mixtures thereof.

Among the phase transfer catalysts that may be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Suitable phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is $Cl^-$, $Br^-$, a $C_{1-8}$ alkoxy group or a $C_{6-18}$ aryloxy group. An effective amount of a phase transfer catalyst may be 0.1 to 10 wt % based on the weight of bisphenol in the phosgenation mixture. In another embodiment an effective amount of phase transfer catalyst may be 0.5 to 2 wt % based on the weight of bisphenol in the phosgenation mixture.

Alternatively, melt processes may be used to make the polycarbonates. Generally, in the melt polymerization process, polycarbonates may be prepared by co-reacting, in a molten state, the dihydroxy reactant(s) and a diaryl carbonate ester, such as diphenyl carbonate, in the presence of a transesterification catalyst in a Banbury® mixer, twin screw extruder, or the like to form a uniform dispersion. Volatile monohydric phenol is removed from the molten reactants by distillation and the polymer is isolated as a molten residue. A specifically useful melt process for making polycarbonates uses a diaryl carbonate ester having electron withdrawing substituents on the aryls. Examples of specifically useful diaryl carbonate esters with electron withdrawing substituents include bis(4-nitrophenyl)carbonate, bis(2-chlorophenyl)carbonate, bis(4-chlorophenyl)carbonate, bis(methyl salicyl)carbonate, bis(4-methylcarboxylphenyl)carbonate, bis(2-acetylphenyl)carboxylate, bis(4-acetylphenyl) carboxylate, or a combination comprising at least one of these. In addition, suitable transesterification catalyst for use may include phase transfer catalysts of formula $(R^3)_4Q^+X$ above, wherein each $R^3$, Q, and X are as defined above. Examples of suitable transesterification catalysts include tetrabutylammonium hydroxide, tetrabutylammonium acetate, tetrabutylphosphonium hydroxide, tetrabutylphosphonium acetate, tetrabutylphosphonium phenolate, or a combination comprising at least one of these.

In addition to the homopolycarbonates, polyester-polycarbonates, and combinations of these as described above, it is also possible to use combinations of the homopolycarbonates and polyester-polycarbonates with other thermoplastic polymers, for example combinations of homopolycarbonates and/or polycarbonate copolymers with polyesters. Suitable polyesters comprise repeating units of formula (6), and may be, for example, poly(alkylene dicarboxylates), liquid crystalline polyesters, and polyester copolymers. It is also possible to use a branched polyester in which a branching agent, for example, a glycol having three or more hydroxyl groups or a trifunctional or multifunctional carboxylic acid has been incorporated. Furthermore, it is sometime desirable to have various concentrations of acid and hydroxyl end groups on the polyester, depending on the ultimate end use of the composition.

An example of a useful class of polyester is the poly(alkylene terephthalate)s. Specific examples of poly(alkylene terephthalate)s include, but are not limited to, poly(ethylene terephthalate) (PET), poly(1,4-butylene terephthalate) (PBT), poly(ethylene naphthanoate) (PEN), poly(butylene naphthanoate), (PBN), (polypropylene terephthalate) (PPT), polycyclohexanedimethanol terephthalate (PCT), and combinations comprising at least one of the foregoing polyesters. Also useful are poly(cyclohexanedimethanol terephthalate)-co-poly(ethylene terephthalate), abbreviated as PETG wherein the polymer comprises greater than or equal to 50 mole % of poly(ethylene terephthalate), and abbreviated as PCTG, wherein the polymer comprises greater than 50 mole % of poly(cyclohexanedimethanol terephthalate). The above polyesters can include the analogous aliphatic polyesters such as poly(alkylene cyclohexanedicarboxylate), an example of which is poly(1,4-cyclohexylenedimethylene-1, 4-cyclohexanedicarboxylate) (PCCD). Also contemplated are the above polyesters with a minor amount, e.g., from 0.5 to 10 percent by weight, of units derived from an aliphatic diacid and/or an aliphatic polyol to make copolyesters.

The polycarbonate may also comprise a polysiloxane-polycarbonate copolymer, also referred to as a polysiloxane-polycarbonate. The polysiloxane (also referred to herein as "polydiorganosiloxane") blocks of the copolymer comprise repeating siloxane units (also referred to herein as "diorganosiloxane units") of formula (8):

wherein each occurrence of R is same or different, and is a $C_{1-13}$ monovalent organic radical. For example, R may independently be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{14}$ aryl group, $C_6$-$C_{10}$ aryloxy group, $C_7$-$C_{13}$ arylalkyl group, $C_7$-$CI_3$ arylalkoxy group, $C_7$-$CI_3$ alkylaryl group, or $C_7$-$C_{13}$ alkylaryloxy group. The foregoing groups may be fully or partially halogenated with fluorine, chlorine, bromine, or iodine, or a combination thereof. Combinations of the foregoing R groups may be used in the same copolymer.

The value of D in formula (8) may vary widely depending on the type and relative amount of each component in the thermoplastic composition, the desired properties of the composition, and like considerations. Generally, D may have an average value of 2 to 1,000, specifically 2 to 500, and more specifically 5 to 100. In one embodiment, D has an average value of 10 to 75, and in still another embodiment, D has an average value of 40 to 60. Where D is of a lower value, e.g., less than 40, it may be desirable to use a relatively larger amount of the polycarbonate-polysiloxane copolymer. Conversely, where D is of a higher value, e.g., greater than 40, it may be necessary to use a relatively lower amount of the polycarbonate-polysiloxane copolymer.

A combination of a first and a second (or more) polysiloxane-polycarbonate copolymer may be used, wherein the average value of D of the first copolymer is less than the average value of D of the second copolymer.

In one embodiment, the polydiorganosiloxane blocks are provided by repeating structural units of formula (9):

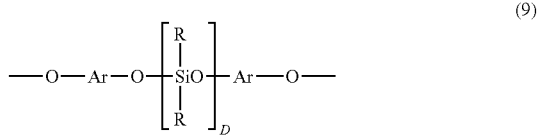

wherein D is as defined above; each R may independently be the same or different, and is as defined above; and each Ar may independently be the same or different, and is a substituted or unsubstituted $C_6$-$C_{30}$ arylene radical, wherein the bonds are directly connected to an aromatic moiety. Suitable Ar groups in formula (9) may be derived from a $C_6$-$C_{30}$ dihydroxyarylene compound, for example a dihydroxyarylene compound of formula (3), (4), or (7) above. Combinations comprising at least one of the foregoing dihydroxyarylene compounds may also be used. Specific examples of suitable dihydroxyarylene compounds are 1,1-bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxyphenyl)cyclohexane, bis(4-hydroxyphenyl sulphide), and 1,1-bis(4-hydroxy-t-butylphenyl)propane. Combinations comprising at least one of the foregoing dihydroxy compounds may also be used.

Units of formula (9) may be derived from the corresponding dihydroxy compound of formula (10):

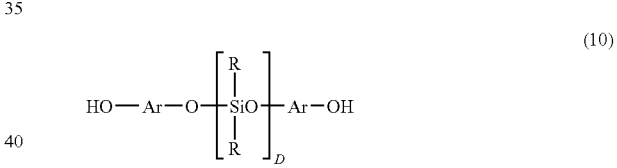

wherein R, Ar, and D are as described above. Compounds of formula (10) may be obtained by the reaction of a dihydroxyarylene compound with, for example, an alpha, omega-bisacetoxypolydiorangonosiloxane under phase transfer conditions.

In another embodiment, polydiorganosiloxane blocks comprise units of formula (11):

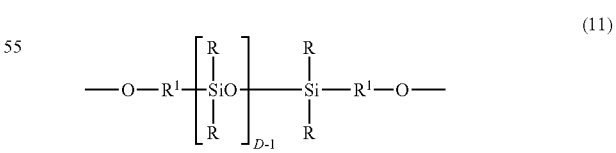

wherein R and D are as described above, and each occurrence of $R^1$ is independently a divalent $C_1$-$C_{30}$ alkylene, and wherein the polymerized polysiloxane unit is the reaction residue of its corresponding dihydroxy compound. In a specific embodiment, the polydiorganosiloxane blocks are provided by repeating structural units of formula (12):

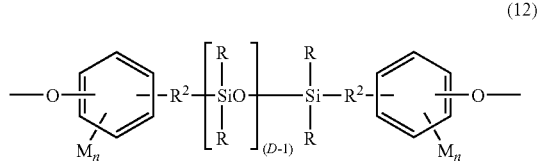

(12)

wherein R and D are as defined above. Each $R^2$ in formula (12) is independently a divalent $C_2$-$C_8$ aliphatic group. Each M in formula (12) may be the same or different, and may be a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ arylalkyl, $C_7$-$C_{12}$ arylalkoxy, $C_7$-$C_{12}$ alkylaryl, or $C_7$-$C_{12}$ alkylaryloxy, wherein each n is independently 0, 1, 2, 3, or 4.

In one embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R^2$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a mixture of methyl and trifluoropropyl, or a mixture of methyl and phenyl. In still another embodiment, M is methoxy, n is one, $R^2$ is a divalent $C_1$-$C_3$ aliphatic group, and R is methyl.

Units of formula (12) may be derived from the corresponding dihydroxy polydiorganosiloxane (13):

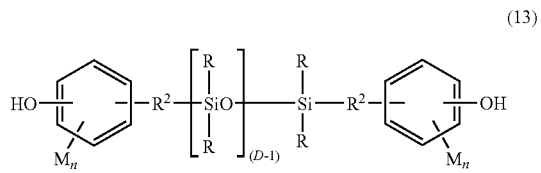

(13)

wherein R, D, M, $R^2$, and n are as described above. Such dihydroxy polysiloxanes can be made by effecting a platinum catalyzed addition between a siloxane hydride of formula (14):

(14)

wherein R and D are as previously defined, and an aliphatically unsaturated monohydric phenol. Suitable aliphatically unsaturated monohydric phenols included, for example, eugenol, 2-allylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol and 2-allyl-4,6-dimethylphenol. Mixtures comprising at least one of the foregoing may also be used.

The polysiloxane-polycarbonate may comprise 50 to 99 wt % of carbonate units and 1 to 50 wt % siloxane units. Within this range, the polysiloxane-polycarbonate copolymer may comprise 70 to 98 wt %, specifically 75 to 97 wt % of carbonate units and 2 to 30 wt %, specifically 3 to 25 wt % siloxane units.

In an embodiment, the polysiloxane-polycarbonate may comprise polysiloxane units, and carbonate units derived from bisphenol A, e.g., the dihydroxy compound of formula (3) in which each of $A^1$ and $A^2$ is p-phenylene and $Y^1$ is isopropylidene. Polysiloxane-polycarbonates may have a weight average molecular weight of 2,000 to 100,000, specifically 5,000 to 50,000 as measured by gel permeation chromatography using a crosslinked styrene-divinyl benzene column, at a sample concentration of 1 milligram per milliliter, and as calibrated with polycarbonate standards.

The polysiloxane-polycarbonate can have a melt volume flow rate, measured at 300° C./1.2 kg, of 1 to 50 cubic centimeters per 10 minutes (cc/10 min), specifically 2 to 30 cc/10 min. Mixtures of polysiloxane-polycarbonates of different flow properties may be used to achieve the overall desired flow property.

The thermoplastic compositions further comprise an aromatic sulfonate compound. Suitable aromatic sulfonate compounds include those of formula (15):

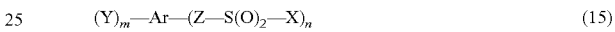

(15)

wherein each X is independently a substituted or unsubstituted $C_1$-$C_{20}$ alkyl, substituted or unsubstituted $C_1$-$C_{20}$ arylalkyl, substituted or unsubstituted $C_6$-$C_{20}$ aryl, or substituted or unsubstituted $C_7$-$C_{40}$ alkylaryl. When present, the substituent on the X group can be, for example, nitro, hydroxy, thio, halogen, or $C_1$-$C_8$ alkoxy. Examples of suitable X groups include, but are not limited to, methyl, ethyl, n-propyl, 2-methylpropyl, n-butyl, 2-methylbutyl, 3-methylbutyl, n-pentyl, 2-methylpentyl, 3-methylpentyl, 4-methylpentyl, n-hexyl, cyclohexyl, n-octyl, 2-ethylhexyl, n-dodecyl, n-octadecyl n-eicosyl, camphoryl, trifluoromethyl, 2,2,2-trifluoroethyl, perfluoroethyl, perfluoro-n-butyl, perfluoro-n-hexyl, perfluoro-n-octyl, perfluorocyclohexyl, perfluoro-(4-ethylcyclohexyl)-2-ethyl, benzyl, 2-methylbenzyl, 3-methylbenzyl, 4-methylbenzyl, phenyl, 2-methylphenyl, 3-methylphenyl, 4-methylphenyl, 3,5-dimethylphenyl, 2,3-dimethylphenyl, 2,4-dimethylphenyl, 2,5-dimethylphenyl, 2,6-dimethylphenyl, 2,3,4-trimethylphenyl, 2,3,5-trimethylphenyl, 3,4,5-trimethylphenyl, 2,4,6-trimethylphenyl, 4-ethylphenyl, 4-n-butylphenyl, 4-tert-butylphenyl, 2-trifluoromethylphenyl, 4-trifluoromethylphenyl, 4-methoxyphenyl, 4-tert-butoxyphenyl, 4-fluorophenyl, 4-chlorophenyl, 4-bromophenyl, naphthyl, $C_1$-$C_8$ alkyl-substituted naphthyl, $C_1$-$C_8$ alkyl ether-substituted naphthyl, halogen-substituted naphthyl, and the like.

Also in formula (15), each Z is an oxygen-containing linking group selected from —O—, or substituted or unsubstituted —(O—$C_{1-20}$—)$_w$—O—, wherein w is 1 to 20. When present, the substituent on the —(O—$C_{1-20}$—)$_w$—O— group can be, for example, nitro, hydroxy, thio, halogen, $C_1$-$C_8$ alkoxy, $C_6$-$C_{20}$ aryl, or $C_6$-$C_{20}$ aryloxy. Suitable Z groups include oxygen diradical, ethanedioxy, 1,2-propanedioxy, 1,3-propanedioxy, 1,2-butanedioxy, 1,3-butanedioxy, 1,4-butanedioxy, 2,3-butanedioxy, 1,2-pentanedioxy, 1,3-pentanedioxy, 1,4-pentanedioxy, 1,5-pentanedioxy, 2,3-pentanedioxy, 2,4-pentanedioxy, 2-methyl-1,2-butanedioxy, 2-methyl-1,3-butanedioxy, 2-methyl-1,4-butanedioxy, 2-methyl-2,3-butanedioxy, 2,2-dimethyl-1,2-propanedioxy, 2,2-dimethyl-1,3-propanedioxy, 3,3-dimethyl-1,2-propanedioxy, 1,1-dimethyl-2,3-propanedioxy, 1,2-hexanedioxy, 1,3-hexanedioxy, 1,4-hexanedioxy, 1,5- hexanedioxy, 1,6-hexanedioxy, 2,3-hexanedioxy, 2,4-hexanedioxy, 2,5-hexanedioxy, 2-methyl-1,2-pentanedioxy, 2-methyl-1,3-pentanedioxy, 2-methyl-1,4-pentanedioxy, 2-methyl-2,3-pentanedioxy, 2-methyl-2,4-pentanedioxy, 2,2-dimethyl-1,2-butanediooxy, 2,2-dimethyl-1,3-butanedioxy, 3,3-dimethyl-1,2-butanedioxy, 1,1-dimethyl-2,3-butanedioxy, and the like; isomers of octanedioxy, decanedioxy, undecanedioxy, dodecanedioxy, hexadecanedioxy, octadecanedioxy, icosananedioxy, and docosananedioxy; and substituted and unsubstituted cyclopropanedioxy, cyclobutanedioxy, cyclopentanedioxy, cyclohexanedioxy, 1,4-dioxymethyl cyclohexane, polyalkylenedioxy units, such as ethylenedioxy, 1,2-propylenedioxy, 1,3-propylenedioxy, 1,2-butylenedioxy, 1,4-butylenedioxy, 1,6-hexylenedioxy, and the like.

Also, in formula (15), Ar is a $C_6$-$C_{62}$ aromatic group. Suitable Ar groups may include $C_6$ aromatic; $C_{10}$ fused aromatic; $C_{14}$ fused aromatic; $C_{20}$ fused aromatic; and $C_{20}$ or higher fused polycyclic aromatics including iptycenes. Examples of suitable Ar groups include, but are not limited to, benzene, naphthalene, anthracene, phenanthrene, triptycene, tetraiptycene, pentaiptycene, and the like. Also in formula (15), m is 0-3 and n is 3-6. In an embodiment, Ar is $C_6$ aromatic group, having a valency of m+n, where m+n is 6. Where m+n is less than the number of available valencies, the unspecified valences are occupied by hydrogen. The —(Z—S(O)$_2$—X) groups may be positioned ortho, meta, or para to each other on the Ar group. In a specific embodiment, at least two of the groups —(Z—S(O)$_2$—X) are positioned ortho to each other on a $C_6$ aromatic group. In a more specific embodiment, each —(Z—S(O)$_2$—X) group is positioned ortho to at least one other —Z—S(O)$_2$—X) group.

Also in formula (15), each Y is independently $C_1$-$C_{20}$ alkyl, substituted $C_1$-$C_{20}$ alkyl, $C_6$-$C_{20}$ aryl, $C_1$-$C_8$ alkyl-substituted $C_6$-$C_{20}$ aryl, halogen, nitro, $C_1$-$C_{20}$ alkoxycarbonyl, $C_1$-$C_{20}$ alkoxy, or $C_1$-$C_{20}$ acyl. Examples of suitable Y groups include, but are not limited to, the halogens (fluoro, chloro, bromo, iodo); alkoxycarbonyl such as methoxy carbonyl, ethyl carbonyl, t-butyl carbonyl, cyclohexyl carbonyl, phenyl carbonyl, and the like; alkoxy groups such as —OCH$_3$, —OCH$_2$CH$_3$, —O-t-butyl, —O-n-butyl, —O-n-octyl, and the like; acyl groups derived from Friedel-Crafts-type acylation of the aromatic ring including acetyl, pivaloyl, n-octyloyl, n-dodecoyl, n-stearoyl, benzoyl, and the like; alkyl groups including methyl, ethyl, propyl, isopropyl, butyl, sec-butyl, tert-butyl, n-pentyl, 2-pentyl, 3-pentyl, isopentyl, neopentyl, hexyl, heptyl, octyl, nonyl, decyl, dodecyl, octadecyl, cyclopropyl, cyclobutyl, cyclopentyl, cyclohexyl, cyclohexyl, adamantyl, norbornyl, and the like; and aryl groups including phenyl, $C_1$-$C_8$ alkylphenyl, $C_1$-$C_8$ alkoxyphenyl, halophenyl, and the like.

The compounds of formula (15) may be derived from the reaction of a sulfonic acid or derivative thereof with a polyhydroxy-substituted aromatic compound having at least three hydroxyl groups. Derivatives of sulfonic acids, such as sulfonic acid halides (e.g., fluoride or chloride), anhydrides, and mixed anhydrides, are useful for effecting sulfonation of the polyhydroxy-substituted aromatic compound. Examples of sulfonic acids that can be derivatized to useful form for preparing the aromatic sulfonate compounds include, but are not limited to, methanesulfonic acid, ethanesulfonic acid, n-propanesulfonic acid, 2-methylpropanesulfonic acid, n-butanesulfonic acid, 2-methylbutanesulfonic acid, 3 methylbutanesulfonic acid, n-pentanesulfonic acid, 2-methylpentanesulfonic acid, 3-methylpentanesulfonic acid, 4-methylpentanesulfonic acid, n-hexanesulfonic acid, cyclohexanesulfonic acid, n-octanesulfonic acid, 2-ethylhexanesulfonic acid, n-dodecanesulfonic acid, n-octadecanesulfonic acid, n-eicosanesulfonic acid, camphorsulfonic acid, trifluoromethanesulfonic acid (also referred to as triflic acid), 2,2,2-trifluoroethanesulfonic acid, perfluoroethanesulfonic acid, perfluoro-n-butanesulfonic acid, perfluoro-n-hexanesulfonic acid, perfluoro-n-octanesulfonic acid, perfluorocyclohexanesulfonic acid, perfluoro-(4-ethylcyclohexyl)-2-ethylsulfonic acid, benzenesulfonic acid, 2-methylbenzenesulfonic acid, 3-methylbenzenesulfonic acid, 4-methylbenzenesulfonic acid (p-toluenesulfonic acid), 3,5-dimethylbenzenesulfonic acid, 2,3-dimethylbenzenesulfonic acid, 2,4-dimethylbenzenesulfonic acid, 2,5-dimethylbenzenesulfonic acid, 2,6-dimethylbenzenesulfonic acid, 2,3,4-trimethylbenzenesulfonic acid, 2,3,5-trimethylbenzenesulfonic acid, 3,4,5-trimethylbenzenesulfonic acid, 2,4,6-trimethylbenzenesulfonic acid, ethyl benzenesulfonic acid, butyl benzenesulfonic acid, tert-butylbenzenesulfonic acid, 4-methoxybenzenesulfonic acid, 4-tert-butoxybenzenesulfonic acid, 2-fluorobenzenesulfonic acid, 4-fluorobenzenesulfonic acid, 4-chlorobenzenesulfonic acid, 4-bromobenzenesulfonic acid, 2-trifluoromethylbenzene sulfonic acid, naphthalenesulfonic acid, alkyl naphthalenesulfonic acids, alkyloxy naphthalenesulfonic acids, halo-substituted naphthalenesulfonic acids, and the like. Of the derivatives of the foregoing, p-toluenesulfonyl chloride (also referred to as tosyl chloride), n-octanesulfonyl chloride, camphorsulfonyl chloride, perfluoro-n-butanesulfonyl fluoride, perfluorobutanesulfonyl chloride, methanesulfonyl chloride (also referred to as mesyl chloride), and trifluoromethanesulfonyl chloride are specifically useful.

Polyhydroxy-substituted aromatic compounds having three or more hydroxy groups may be condensed with the sulfonic acid derivative, as discussed above, to provide an aromatic sulfonate compound of formula (15). Suitable polyhydroxy-substituted aromatic compounds include, but are not limited to, 1,2,3-trihydroxybenzene(pyrogallol), 1,2,4-trihydroxybenzene, 1,3,5-trihydroxybenzene(phloroglucinol), 1-methyl-3,4,5-trihydroxybenzene, and the like. An example of a specifically suitable polyaromatic compound is 1,2,3-trihydroxybenzene(pyrogallol). Where a polyhydroxy aromatic compound is condensed with the sulfonic acid derivative to form an aromatic sulfonate compound of formula (15), the X group of the sulfonic acid derivative may be either aliphatic or aromatic. Specific examples of useful aromatic sulfonate compounds include, but are not limited to, pyrogallol tristosylate, pyrogallol trisbenzenesulfonate, pyrogallol trisoctylsulfonate, and phloroglucinol tristosylate, or a combination comprising at least one of these.

The condensation reaction between the derivative of the sulfonic acid, and the polyhydroxyaromatic compound or polyol, may generally be carried out in a single phase using an organic solvent, in the presence of a base; alternatively, the condensation reaction may be carried out in a biphasic reaction using an organic solvent and water, in the presence of a base.

The aromatic sulfonate compound is used in the thermoplastic composition in an amount effective to prevent yellowing of the polycarbonate upon irradiation, in particular exposure to gamma radiation. Effective amounts are readily determined by one of ordinary skill in the art, and will vary depending upon the type of resin(s) used in the composition, the type and amount of other additives, and the intended use of the composition. In general, the aromatic sulfonate compound is present in the thermoplastic composition in an amount of 0.001 to 500 millimoles per kilogram (mmol/Kg), more specifically 0.01 to 50 mmol/Kg, and even more specifically 0.1 to 5 mmol/kg, based on the total weight of the polycarbonate resin and the aromatic sulfonate compound. Amounts lower than 0.001 mmol/Kg may not be effective, while amounts greater than about 500 mmol/Kg do not lead to improved stability, and/or can adversely affect the mechanical properties of the thermoplastic composition. In an embodiment, a masterbatch composition comprising polycarbonate and high levels of 5 to 500 mmol/Kg of aromatic sulfonate composition may be prepared, wherein the masterbatch is further combined with polycarbonate resin and/or other polymer to form the thermoplastic composition.

Alternatively, the aromatic sulfonate compound is present in an amount of 0.001 to 20 wt %, more specifically 0.01 to about 10 wt %, and even more specifically 0.1 to 1 wt %, based on the total weight of the polycarbonate resin and the aromatic sulfonate compound. Amounts lower than 0.001 wt % may not be effective, while amounts greater than about 20 wt % do not lead to improved stability, and/or can adversely affect the mechanical properties of the thermoplastic composition. In an embodiment, a masterbatch composition comprising polycarbonate and high levels of 1.0 to 20 wt % of aromatic sulfonate composition may be prepared, wherein the masterbatch is further combined with polycarbonate resin and/or other polymer to form the thermoplastic composition.

In an unexpected and advantageous feature, however, it has been found that unexpectedly small amounts of aromatic sulfonate compound are effective to prevent yellowing upon exposure to radiation, including gamma radiation. In one embodiment, an effective amount of aromatic sulfonate compound is 0.05 to 25 mmol/Kg, specifically 0.1 to 5 mmol/Kg, more specifically 0.2 to 3 mmol/Kg, more specifically 0.25 to 2.5 mmol/kg, still more specifically 0.5 to 2 mmol/Kg, and still more specifically 0.75 to 1.7 mmol/Kg, each based on the total weight of polycarbonate and aromatic sulfonate compound. The foregoing amounts may be limited by the proviso that the total amount of aromatic sulfonate compound does not exceed 0.5 wt % of the total weight of polycarbonate and aromatic sulfonate compound, more specifically 0.25 wt %, still more specifically 0.2, and even more specifically 0.1 wt % of the total weight of the polycarbonate and aromatic sulfonate compound.

Alternatively, the aromatic sulfonate compound is used in the thermoplastic composition in an amount of 0.001 to 0.25 wt %, more specifically 0.002 to 0.2 wt %, more specifically 0.003 to 0.15 wt %, still more specifically 0.004 to 0.1 wt %, and still more specifically 0.005 to 0.095 wt %, based on the total weight of the polycarbonate and aromatic sulfonate compound.

The thermoplastic composition may further comprise an ionizing radiation stabilizing additive. Exemplary ionizing radiation stabilizing additives include certain aliphatic alcohols, aromatic alcohols, aliphatic diols, aliphatic ethers, esters, diketones, alkenes, thiols, thioethers and cyclic thioethers, sulfones, dihydroaromatics, diethers, nitrogen compounds, or a combination comprising at least one of the foregoing. Alcohol-based stabilizing additives may be selected from mono, di-, or polysubstituted alcohols, and can be straight, branched, cyclic and/or aromatic. Suitable aliphatic alcohols may include alkenols with sites of unsaturation, examples of which include 4-methyl-4-penten-2-ol, 3-methyl-pentene-3-ol, 2-methyl-4-penten-2-ol, 2,4-dimethyl-4-penten-2-ol, 2-phenyl-4-penten-2-ol, and 9-decen-1-ol; tertiary alcohols including 3-hydroxy-3-methyl-2-butanone, 2-phenyl-2-butanol, and the like; hydroxy-substituted tertiary cycloaliphatics such as 1-hydroxy-1-methyl-cyclohexane; and hydroxymethyl aromatics having an aromatic ring with carbinol substituents such as a methylol group (—CH$_2$OH) or a more complex hydrocarbon group such as (—CRHOH) or (—CR$_2$OH), wherein R is straight chain C$_1$-C$_{20}$ alkyl or branched C$_1$-C$_{20}$ alkyl. Exemplary hydroxy carbinol aromatics include benzhydrol, 2-phenyl-2-butanol, 1,3-benzenedimethanol, benzyl alcohol, 4-benzyloxy-benzyl alcohol, and benzyl-benzyl alcohol.

Useful classes of ionizing radiation stabilizing additives are di- and polyfunctional aliphatic alcohols, also referred to as aliphatic diols and aliphatic polyols. Specifically useful are aliphatic diols of formula (16):

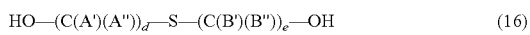

HO—(C(A')(A''))$_d$—S—(C(B')(B''))$_e$—OH   (16)

wherein A', A'', B', and B'' are each independently H or C$_1$-C$_6$ alkyl; S is C$_1$-C$_{20}$ alkyl, C$_2$-C$_{20}$ alkyleneoxy, C$_3$-C$_6$ cycloalkyl, or C$_3$-C$_6$ substituted cycloalkyl; and d and e are each 0 or 1, with the proviso that, when d and e are each 0, S is selected such that both —OH groups are not connected directly to a single common carbon atom.

In formula (16), A', A'', B', and B'' can each be independently selected from H, methyl, ethyl, n-propyl, isopropyl, n-butyl, sec-butyl, t-butyl, n-pentyl, 2-pentyl, 3-pentyl, isopentyl, neopentyl, n-hexyl, 2-hexyl, 3-hexyl, 2-methyl pentyl, 3-methylpentyl, 2,2-dimethylbutyl, 2,3-dimethylbutyl, and the like, and a combination comprising at least one of the foregoing alkyl groups.

Spacer group S can be selected from methanediyl, ethanediyl, 1,1-ethanediyl, 1,1-propanediyl, 1,2-propanediyl, 1,3-propanediyl, 2,2-propanediyl, 1,1-butanediyl, 1,2-butanediyl, 1,3-butanediyl, 1,4-butanediyl, 2,2-butanediyl, 2,3-butanediyl, 1,1-pentanediyl, 1,2-pentanediyl, 1,3-pentanediyl, 1,4-pentanediyl, 1,5-pentanediyl, 2,2-pentanediyl, 2,3-pentanediyl, 2,4-pentanediyl, 3,3-pentanediyl, 2-methyl-1,1-butanediyl, 3-methyl-31,1-butanediyl, 2-methyl-1,2-butanediyl, 2-methyl-1,3-butanediyl, 2-methyl-1,4-butanediyl, 2-methyl-2,2-butanediyl, 2-methyl-2,3-butanediyl, 2,2-dimethyl-1,1-propanediyl, 2,2-dimethyl-1,2-propanediyl, 2,2-dimethyl-1,3-propanediyl, 3,3-dimethyl-1,1-propanediyl, 3,3-dimethyl-1,2-propanediyl, 3,3-dimethyl-2,2-propanediyl, 1,1-dimethyl-2,3-propanediyl, 3,3-dimethyl-2,2-propanediyl, 1,1-hexanediyl, 1,2-hexanediyl, 1,3-hexanediyl, 1,4-hexanediyl, 1,5-hexanediyl, 1,6-hexanediyl, 2,2-hexanediyl, 2,3-hexanediyl, 2,4-hexanediyl, 2,5-hexanediyl, 3,3-hexanediyl, 2-methyl-1,1-pentanediyl, 3-methyl-1,1-pentanediyl, 2-methyl-1,2-pentanediyl, 2-methyl-1,3-pentanediyl, 2-methyl-1,4-pentanediyl, 2-methyl-2,2-pentanediyl, 2-methyl-2,3-pentanediyl, 2-methyl-2,4-pentanediyl, 2,2-dimethyl-1,1-butanediyl, 2,2-dimethyl-1,2-butanediyl, 2,2-dimethyl-1,3-butanediyl, 3,3-dimethyl-1,1-butanediyl, 3,3-dimethyl-1,2-butanediyl, 3,3-dimethyl-2,2-butanediyl, 1,1-dimethyl-2,3-butanediyl, 3,3-dimethyl-2,2-butanediyl, and the like; isomers of octanediyl, decanediyl, undecanediyl, dodecanediyl, hexadecanediyl, octadecanediyl, icosananediyl, and docosananediyl; and substituted and unsubstituted cyclopropanediyl, cyclobutanediyl, cyclopentanediyl, cyclohexanediyl, wherein substituents may be the points of radical attachment, such as in 1,4-dimethylenecyclohexane, or may include branched and straight chain alkyl, cycloalkyl, and the like. Additionally, the spacer group S may be selected from one or more diradicals comprising polyalkyleneoxy units, such as ethyleneoxy, 1,2-propyleneoxy, 1,3-propyleneoxy, 1,2-butyleneoxy, 1,4-butyleneoxy, 1,6-hexyleneoxy, and the like; and a combination comprising at least one of these.

Specific examples of suitable aliphatic diols include ethylene glycol, propylene glycol, 1,3-propanediol, 1,2-butanediol, 1,4-butanediol, meso-2,3-butanediol, 1,2-pentanediol, 2,3-pentanediol, 1,4-pentanediol, 1,4-hexandiol, and the like; alicyclic alcohols such as 1,3-cyclobutanediol, 2,2,4,4-tetramethylcyclobutanediol, 1,2-cyclopentanediol, 1,2-cyclohexanediol, 1,3-cyclohexanediol, 1,4-cyclohexanediol, 1,4-dimethylolcyclohexane, and the like; branched acyclic diols such as 2,3-dimethyl-2,3-butanediol (pinacol), and 2-methyl-2,4-pentanediol (hexylene glycol); and polyalkyleneoxy-containing alcohols such as polyethylene glycol, polypropylene glycol, block or random poly(ethyleneglycol-co-propyleneglycols), and diols of copolymers containing polyalkyleneoxy-groups. Useful polyols may include polyaryleneoxy compounds such as polyhydroxystyrene; alkyl polyols such as polyvinylalcohol, polysaccharaides, and esterified polysaccharides. A combination comprising at least one of the foregoing may also be useful. Specifically suitable diols include 2-methyl-2,4-pentanediol (hexylene glycol), polyethylene glycol, and polypropylene glycol.

Suitable aliphatic ethers may include alkoxy-substituted cyclic or acyclic alkanes such as, for example, 1,2-dialkoxyethanes, 1,2-dialkoxypropanes, 1,3-dialkoxypropanes, alkoxycyclopentanes, alkoxycyclohexanes, and the like. Ester compounds (—COOR) may be useful as stabilizers wherein R may be a substituted or unsubstituted, aromatic or aliphatic, hydrocarbon and the parent carboxy compound may likewise be substituted or unsubstituted, aromatic or aliphatic, and/or mono- or polyfunctional. When present, substituents may include, for example, $C_1$-$C_8$ alkyl, $C_1$-$C_8$ alkyl ether, $C_6$-$C_{20}$ aryl, and the like. Esters which have proven useful include tetrakis(methylene [3,5-di-t-butyl-4-hydroxy-hydrocinnamate])methane, 2,2'-oxamido bis(ethyl-3-(3,5-di-t-butyl-4-hydroxyphenyl) propionate, and triifunctional hindered phenolic ester compounds such as GOODRITE® 3125, available from B. F. Goodrich in Cleveland Ohio.

Diketone compounds may also be used, specifically those having two carbonyl functional groups and separated by a single intervening carbon atoms such as, for example 2,4-pentadione.

Sulfur-containing compounds, suitable for use as stabilizing additives, can include thiols, thioethers and cyclic thioethers. Thiols include, for example, 2-mercaptobenzothiazole; thioethers include dilaurylthiopropionate; and cyclic thioethers include 1,4-dithiane, 1,4,8,11-tetrathiocyclotetradecane. Cyclic thioethers containing more than one thioether group are useful, specifically those having a single intervening carbon between two thioether groups such as in, for example, 1,3-dithiane. The cyclic ring may contain oxygen or nitrogen members.

Aryl or alkyl sulfone stabilizing additives of general structure R—S(O)$_2$—R' may also be used, where R and R' comprise $C_1$-$C_{20}$ alkyl, $C_6$-$C_{20}$ aryl, $C_1$-$C_{20}$ alkoxy, $C_6$-$C_{20}$ aryloxy, substituted derivatives thereof, and the like, and wherein at least one of R or R' is a substituted or unsubstituted benzyl. When present, substituents may include, for example, $C_1$-$C_8$ alkyl, $C_1$-$C_8$ alkyl ether, $C_6$-$C_{20}$ aryl, and the like. An example of a specifically useful sulfone is benzylsulfone.

Alkenes may be used as stabilizing additives. Suitable alkenes may include olefins of general structure RR'C=CR''R''' wherein R, R', R'', and R''' may each individually be the same or different and may be selected from hydrogen, $C_1$-$C_{20}$ alkyl, $C_1$-$C_{20}$ cycloalkyl, $C_1$-$C_{20}$ alkenyl, $C_1$-$C_{20}$ cycloalkenyl, $C_6$-$C_{20}$ aryl, $C_6$-$C_{20}$ arylalkyl, $C_6$-$C_{20}$ alkylaryl, $C_1$-$C_{20}$ alkoxy, $C_6$-$C_{20}$ aryloxy and substituted derivatives thereof. When present, substituents may include, for example, $C_1$-$C_8$ alkyl, $C_1$-$C_8$ alkyl ether, $C_6$-$C_{20}$ aryl, and the like. The olefins may be acyclic, exocyclic, or endocyclic. Examples of specifically useful alkenes include 1,2-diphenyl ethane, allyl phenol, 2,4-dimethyl-1-pentene, limonene, 2-phenyl-2-pentene, 2,4-dimethyl-1-pentene, 1,4-diphenyl-1,3-butadiene, 2-methyl-1-undecene, 1-dodecene, and the like, or a combination comprising at least one of the foregoing.

Hydroaromatic compounds may also be useful as stabilizing additives, including partially hydrogenated aromatics, and aromatics in combination with an unsaturated ring. Specific aromatics include benzene and/or naphthalene based systems. Examples of suitable hydroaromatic compounds include indane, 5,6,7,8-tetrahydro-1-naphthol, 5,6,7,8-tetrahydro-2-naphthol, 9,10-dihydro anthracene, 9,10-dihydrophenanthrene, 1-phenyl-1-cyclohexane, 1,2,3,4-tetrahydro-1-naphthol, and the like, or a combination comprising at least one of the foregoing.

Diethers, including hydrogenated and nonhydrogenated, and substituted and unsubstituted pyrans, may also be used as stabilizing additives. When present, substituents may include $C_1$-$C_8$ alkyl, $C_1$-$C_8$ alkyl ether, or $C_6$-$C_{20}$ aryl. The pyrans may have substituents including $C_1$-$C_{20}$ alkyl, $C_6$-$C_{20}$ aryl, $C_1$-$C_{20}$ alkoxy, or $C_6$-$C_{20}$ aryloxy, and which may be positioned on any carbon of the pyran ring. Specifically useful substituent groups include $C_1$-$C_2$0 alkoxy or $C_6$-$C_{20}$ aryloxy, located on the ring at the six position. Hydrogenated pyrans are specifically useful. Examples of suitable diethers include dihydropyranyl ethers and tetrahydropyranyl ethers.

Nitrogen compounds which may function as stabilizers include high molecular weight oxamide phenolics, for example, 2,2-oxamido bis-[ethyl 3-(3,5-di-tert-butyl-4-hydroxyphenyl)propionate], high molecular weight oxalic anilides and their derivatives, and amine compounds such as thiourea.

Ionizing radiation stabilizing additives are typically used in amounts of 0.001 to 1 wt %, specifically 0.005 to 0.75 wt %, more specifically 0.01 to 0.5 wt %, and still more specifically 0.05 to 0.25 wt %, based on the total weight of the polycarbonate and aromatic sulfonate compound. In an embodiment, a specifically suitable ionizing radiation stabilizing additive is an aliphatic diol.

The thermoplastic composition may further comprise a hydrolysis stabilizer. Typical hydrolysis stabilizers may include carbodiimide-based additives such as aromatic and/or cycloaliphatic monocarbo-diimides substituted in position 2 and 2', such as 2,2',6,6'-tetraisopropyidiphenylcarbodiimide. Polycarbodiimides having a molecular weight of over 500 grams per mole are also suitable. Other compounds useful as hydrolysis stabilizers include an epoxy modified acrylic oligomers or polymers, and oligomers based on cycloaliphatic epoxides. Specific examples of suitable epoxy functionalized stabilizers include Cycloaliphatic Epoxide Resin ERL-4221 supplied by Union Carbide Corporation (a subsidiary of Dow Chemical), Danbury, Conn.; and JONCRYL® ADR-4300 and JONCRYL® ADR-4368, available from Johnson Polymer Inc, Sturtevant, Wis. Hydrolysis stabilizers can be used in amounts of 0.001 to 1 wt %, specifically 0.01 to 0.5 wt %, and more specifically 0.1 to 0.3 wt %, based on the total weight of the polycarbonate and aromatic sulfonate compound.

As discussed above, when exposed to gamma radiation, polycarbonates become yellowed in color, with the degree of yellowness increasing with increasing exposure dose of the gamma radiation. At sufficiently high radiation doses, the yellow color may become sufficiently dark that an article prepared from the polycarbonate is compromised in its usefulness. Likewise, with increasing gamma radiation doses, transparency decreases.

While it is not required to provide an explanation of how an invention works, such theories may be useful to for the purposes of better helping the reader to comprehend the invention. Thus, it is to be understood that the claims are not to be limited by the following theory of operation. It is believed that exposure to gamma radiation generates free radical breakdown products of the polycarbonate which can react to form species with extended pi-bond conjugation, and that therefore have a yellow color. Stabilizers can be included in the polycarbonate and used to stabilize or react with these radical species, thus slowing the degradation of polycarbonates, but none appear to be sufficiently active to completely prevent yellowing. The yellowness index of a polycarbonate having a prior art ionizing radiation stabilizing additive alone after exposure to a gamma radiation dose of 83 kGy is typically greater than about 50, compared with a yellowness index value of less than 1 for the composition before exposure. Similarly, the loss in transparency of a polycarbonate stabilized in this way and treated with the same gamma radiation dose can be greater than or equal to about 15%.

The use of other types of stabilizers, such as those based on photoacid generators that produce sulfonic acids, in particular monofunctional photoacid generators or difunctional photoacid generators having straight-chain (i.e., unbranched) alkyl or polyether groups that produce sulfonic acids (1 or 2 equivalents of acid per molecule of photoacid generator) have been found to require loadings of the stabilizer in excess of 0.5% by weight of the composition. Increased amounts of generated acid can lead to the formation of other breakdown products in the polycarbonate, thus potentially causing additional degradation of the polycarbonate and mitigating the effectiveness of the stabilizer. Additives having aromatic or benzylic oxy and/or carbonyl groups, and with or without alcohol functional groups present, have been included with such prior art mono- and di-functional photoacid generators to improve their performance. However, the use of such additives is not desirable for various reasons of cost, volatility, and concerns about handling, specifically for odor threshold and workplace exposure. Brominated compounds such as, for example, brominated bisphenol A, have also been found to be useful for reducing yellowing of polycarbonate compounds. However, concerns about the environmental impacts of halides such as bromine make this class of compounds less desirable to use. Blue and/or violet colorants have also been added to polycarbonate compositions in order to offset the yellowness resulting from the sterilization. Compositions comprising a colorant and articles molded from them may be visibly blue or violet shaded. However, color compensation may not be an effective strategy for obtaining colorless parts especially as the dose of ionizing radiation is increased. In addition, the amount of colorant added to the resin is often selected for a given radiation dose, and thus variation of exposure dose due to process variability or re-sterilization may cause visible color differences between sterilized articles.

Surprisingly, it has been found that a polycarbonate and an aromatic sulfonate compound as described herein can be used to make a thermoplastic composition that has significantly improved resistance to yellowing upon exposure to gamma radiation. The presence of the aromatic sulfonate compound provides a higher degree of stability in a thermoplastic composition comprising polycarbonate upon exposure to gamma radiation, per unit of aromatic sulfonate compound used, than observed with the aforementioned prior art stabilizers. A low loading of less than 0.5 wt % of the substituted aromatic composition in the polycarbonate composition can accomplish this. Such low loadings of substitituted aromatic composition can allow the preparation of thermoplastic compositions with low color (i.e., without added pigment or dye) useful for making articles wherein the article has a thickness of 3.2±0.12 millimeters and a transmission of greater than 95% according to ASTM D1003-00, and wherein these properties are maintained after gamma irradiation at a total dose of up to 83 kGy.

Again without wishing to be bound by theory, it is believed that the aromatic sulfonate compounds disclosed herein generate active radical species more efficiently than the prior art mono- or disubstituted aromatic compounds, and thereby provide a higher concentration of active radicals per unit of gamma radiation energy absorbed. Under this theory, these active radicals are believed to neutralize reactive species generated from polycarbonates, which would otherwise lead to polycarbonate degradation products that can lead to increased yellowness in the polycarbonate. Including an ionizing radiation stabilizing additive, specifically an aliphatic diol, with the polycarbonate and aromatic sulfonate compound, can provide an additional synergistic improvement in resistance to increase in yellowness. Further, including a hydrolysis stabilizer having epoxy functional groups with the polycarbonate, aromatic sulfonate compound, and aliphatic diol, can provide yet a further improvement in resistance to an increase in yellowness. It is further believed that the presence of the hydrolysis stabilizer neutralizes additional reactive species, thereby providing the additional stabilizing effect. The amounts and identities of the polycarbonate, aromatic sulfonate compound, and where also included, ionizing radiation stabilizing additive and/or hydrolysis stabilizer, are selected such that the increase in the yellowness of an article molded from the thermoplastic composition prepared therewith is minimized after gamma radiation exposure.

The increase in yellowness of a thermoplastic composition after gamma radiation exposure may be determined by measuring the yellowness index (YI) of a molded article prepared from the thermoplastic composition, and comparing to the YI of the article before exposure. The YI of the thermoplastic composition can be measured using transmittance and/or reflective spectroscopic methods depending upon the combination of transparency, color, and surface finish appearance of the article molded from the thermoplastic composition. Where a molded article prepared from the thermoplastic composition is either transparent or translucent; is colorless, white, or off-white; and is glossy, semi-glossy, or non-glossy, the YI of the molded article may be determined according to ASTM D1925-70. Where the molded article is opaque; is off-white or non-white; and has a glossy surface finish, the YI may be determined using reflectance measurement according to ASTM E313-73. Generally, higher doses of ionizing radiation give larger increases in measured yellowness index, and lower doses of ionizing radiation give smaller increases in yellowness index. It has been observed that the increase in measured yellowness index in the thermoplastic compositions does not necessarily increase linearly with increasing dose. The thermoplastic composition from which the article for testing is molded can contain additives including ionizing radiation stabilizing additives, and other additives typically included with polycarbonates, such as mold release agents and antioxidants, wherein the presence of these additives in an amount effective to perform the intended function does not significantly adversely affect the desired properties of the thermoplastic composition. Typically, the total amount of these additives is less than 1.0 percent by weight of the total weight of components present in thermoplastic composition. In an exemplary embodiment, additives present in the thermoplastic composition used to prepare a molded article for yellowness testing may include 0.15 weight percent of 2-methyl-2,4-pentanediol as aliphatic diol, 0.27 weight percent pentaerythritol tetrastearate as a mold release agent, and 0.027 weight percent of 2,6-di-tert-butylphenyl)phosphite as an antioxidant.

Thus, in an embodiment, a molded article having a thickness of 3.2±0.12 millimeters and consisting of the polycarbonate, aromatic sulfonate compound, and an effective amount (for the purposes of this test, defined herein as less than 1.0 wt % of the total weight of the article) of each of a mold-release agent and an antioxidant has, after exposure to a total gamma radiation dose of 83 kGy and when measured according to ASTM D1925-70, an increase in yellowness index (dYI) of less than or equal to 45, specifically less than or equal to 40, more specifically less than or equal to 30, still more specifically less than or equal to 20, and still more specifically less than or equal to 19, when compared to the unexposed molded article. In an embodiment, the article consisting of the polycarbonate and aromatic sulfonate compound (compounded as a masterbatch), a polycarbonate resin, and the mold-release agent and antioxidant has dYI values that are the same as those of an article prepared without using a masterbatch.

In another embodiment, a molded article having a thickness of 3.2±0.12 millimeters and consisting of polycarbonate, aromatic sulfonate compound, aliphatic diol, and an effective amount of each of a mold-release agent and an antioxidant has, after exposure to a total gamma radiation dose of 83 kGy and when measured according to ASTM D1925-70, an increase in yellowness index (dYI) of less than or equal to 29, specifically less than or equal to 25, more specifically less than or equal to 23, and still more specifically less than or equal to 20, when compared to the unexposed molded article. In another embodiment, a molded article having a thickness of 3.2±0.12 millimeters and consisting of polycarbonate, aromatic sulfonate compound, aliphatic diol, and an effective amount of each of a mold-release agent and an antioxidant has, after exposure to a total gamma radiation dose of 59 kGy and when measured according to ASTM D1925-70, an increase in yellowness index (dYI) of less than or equal to 9, specifically less than or equal to 8.5, more specifically less than or equal to 8, and still more specifically less than or equal to 7.5, when compared to the unexposed molded article. In another embodiment, a molded article having a thickness of 3.2±0.12 millimeters and consisting of polycarbonate, aromatic sulfonate compound, aliphatic diol, and an effective amount of each of a mold-release agent and an antioxidant has, after exposure to a total gamma radiation dose of 32 kGy and when measured according to ASTM D1925-70, an increase in yellowness index (dYI) of less than or equal to 5, specifically less than or equal to 4.8, more specifically less than or equal to 4.5, and still more specifically less than or equal to 4.3, when compared to the unexposed molded article.

In another embodiment, a molded article having a thickness of 3.2±0.12 millimeters and consisting of polycarbonate, aromatic sulfonate compound, aliphatic diol, hydrolysis stabilizer, and an effective amount of each of a mold-release agent and an antioxidant has, after exposure to a total gamma radiation dose of 83 kGy and when measured according to ASTM D1925-70, an increase in yellowness index (dYI) of less than or equal to 35, specifically less than or equal to 30, more specifically less than or equal to 20, and still more specifically less than or equal to 15, when compared to the unexposed molded article. In another embodiment, a molded article having a thickness of 3.2±0.12 millimeters and consisting of polycarbonate, aromatic sulfonate compound, aliphatic diol, hydrolysis stabilizer, and an effective amount of each of a mold-release agent and an antioxidant has, after exposure to a total gamma radiation dose of 51 kGy and when measured according to ASTM D1925-70, an increase in yellowness index (dYI) of less than or equal to 13, specifically less than or equal to 10, more specifically less than or equal to 9, and still more specifically less than or equal to 8, when compared to the unexposed molded article.

In addition to the polycarbonate, other resins, aromatic sulfonate compound, and where desired, ionizing radiation stabilizing additive and/or hydrolysis stabilizer, the thermoplastic composition may include various other additives ordinarily incorporated with thermoplastic compositions of this type, with the proviso that the additives are selected so as not to adversely affect the desired properties of the thermoplastic composition. Mixtures of additives may be used. Such additives may be mixed at a suitable time during the mixing of the components for forming the thermoplastic composition.

The thermoplastic composition may comprise a colorant such as a pigment and/or dye additive. Suitable pigments include for example, inorganic pigments such as metal oxides and mixed metal oxides such as zinc oxide, titanium dioxides, iron oxides or the like; sulfides such as zinc sulfides, or the like; aluminates; sodium sulfo-silicates, sulfates, chromates, or the like; carbon blacks; zinc ferrites; ultramarine blue; Pigment Brown 24; Pigment Red 101; Pigment Yellow 119; organic pigments such as azos, di-azos, quinacridones, perylenes, naphthalene tetracarboxylic acids, flavanthrones, isoindolinones, tetrachloroisoindolinones, anthraquinones, anthanthrones, dioxazines, phthalocyanines, and azo lakes; Pigment Blue 60, Pigment Red 122, Pigment Red 149, Pigment Red 177, Pigment Red 179, Pigment Red 202, Pigment Violet 29, Pigment Blue 15, Pigment Blue 15:4, Pigment Blue 28, Pigment Green 7, Pigment Yellow 147 and Pigment Yellow 150, or combinations comprising at least one of the foregoing pigments. Pigments can be used in amounts of 0.01 to 10 percent by weight, based on the total weight of the polycarbonate and aromatic sulfonate compound.

Suitable dyes can be organic materials and include, for example, coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly ($C_{2-8}$) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3"",5""-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene; chrysene; rubrene; coronene, or the like, or combinations comprising at least one of the foregoing dyes. Where it is desirable to use organic dyes and pigments, the dyes may be screened to determine their sensitivity to gamma radiation at a given exposure dose or range of exposure doses. Dyes can be used in amounts of 0.01 to 10 percent by weight, based on the total weight of the polycarbonate and aromatic sulfonate compound.

The thermoplastic composition may include an impact modifier to increase its impact resistance, where the impact modifier is present in an amount that does not adversely affect the desired properties of the thermoplastic composition. These impact modifiers include elastomer-modified graft copolymers comprising (i) an elastomeric (i.e., rubbery) polymer substrate having a Tg less than 10° C., more specifically less than –10° C., or more specifically –40° to –80° C., and (ii) a rigid polymeric superstrate grafted to the elastomeric polymer substrate. As is known, elastomer-modified graft copolymers may be prepared by first providing the elastomeric polymer, then polymerizing the constituent monomer(s) of the rigid phase in the presence of the elastomer to obtain the graft copolymer. The grafts may be attached as graft branches or as shells to an elastomer core. The shell may merely physically encapsulate the core, or the shell may be partially or essentially completely grafted to the core.

Suitable materials for use as the elastomer phase include, for example, conjugated diene rubbers; copolymers of a conjugated diene with less than 50 wt % of a copolymerizable monomer; olefin rubbers such as ethylene propylene copolymers (EPR) or ethylene-propylene-diene monomer rubbers (EPDM); ethylene-vinyl acetate rubbers; silicone rubbers; elastomeric $C_{1-8}$ alkyl (meth)acrylates; elastomeric copolymers of $C_{1-8}$ alkyl (meth)acrylates with butadiene and/or styrene; or combinations comprising at least one of the foregoing elastomers.

Suitable conjugated diene monomers for preparing the elastomer phase are of formula (17):

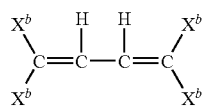

(17)

wherein each $X^b$ is independently hydrogen, $C_1$-$C_5$ alkyl, or the like. Examples of conjugated diene monomers that may be used are butadiene, isoprene, 1,3-heptadiene, methyl-1,3-pentadiene, 2,3-dimethyl-1,3-butadiene, 2-ethyl-1,3-pentadiene; 1,3- and 2,4-hexadienes, and the like, as well as mixtures comprising at least one of the foregoing conjugated diene monomers. Specific conjugated diene homopolymers include polybutadiene and polyisoprene.

Copolymers of a conjugated diene rubber may also be used, for example those produced by aqueous radical emulsion polymerization of a conjugated diene and one or more monomers copolymerizable therewith. Vinyl aromatic compounds may be copolymerized with the ethylenically unsaturated nitrile monomer to forma a copolymer, wherein the vinylaromatic compounds can include monomers of formula (18):

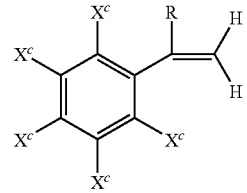

(18)

wherein each $X^c$ is independently hydrogen, $C_1$-$C_{12}$ alkyl, $C_3$-$C_{12}$ cycloalkyl, $C_6$-$C_{12}$ aryl, $C_7$-$C_{12}$ arylalkyl, $C_7$-$C_{12}$ alkylaryl, $C_1$-$C_{12}$ alkoxy, $C_3$-$C_{12}$ cycloalkoxy, $C_6$-$C_{12}$ aryloxy, chloro, bromo, or hydroxy, and R is hydrogen, $C_1$-$C_5$ alkyl, bromo, or chloro. Examples of suitable monovinylaromatic monomers that may be used include styrene, 3-methylstyrene, 3,5-diethylstyrene, 4-n-propylstyrene, alpha-methylstyrene, alpha-methyl vinyltoluene, alpha-chlorostyrene, alpha-bromostyrene, dichlorostyrene, dibromostyrene, tetrachlorostyrene, and the like, and combinations comprising at least one of the foregoing compounds. Styrene and/or alpha-methylstyrene may be used as monomers copolymerizable with the conjugated diene monomer.

Other monomers that may be copolymerized with the conjugated diene are monovinylic monomers such as itaconic acid, acrylamide, N-substituted acrylamide or methacrylamide, maleic anhydride, maleimide, N-alkyl-, aryl-, or haloaryl-substituted maleimide, glycidyl (meth)acrylates, and monomers of the generic formula (19):

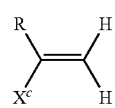

(19)

wherein R is hydrogen, $C_1$-$C_5$ alkyl, bromo, or chloro, and $X^c$ is $C_1$-$C_{12}$ alkoxycarbonyl, $C_1$-$C_{12}$ aryloxycarbonyl, hydroxy carbonyl, or the like. Examples of monomers of formula (17) include, acrylic acid, methyl (meth)acrylate, ethyl (meth)acrylate, n-butyl (meth)acrylate, t-butyl (meth)acrylate, n-propyl (meth)acrylate, isopropyl (meth)acrylate, 2-ethylhexyl (meth)acrylate, and the like, and combinations comprising at least one of the foregoing monomers. Monomers such as n-butyl acrylate, ethyl acrylate, and 2-ethylhexyl acrylate are commonly used as monomers copolymerizable with the conjugated diene monomer. Mixtures of the foregoing monovinyl monomers and monovinylaromatic monomers may also be used.

Suitable (meth)acrylate monomers suitable for use as the elastomeric phase may be cross-linked, particulate emulsion homopolymers or copolymers of $C_{1-8}$ alkyl (meth)acrylates, in particular $C_{4-6}$ alkyl acrylates, for example n-butyl acrylate, t-butyl acrylate, n-propyl acrylate, isopropyl acrylate, 2-ethylhexyl acrylate, and the like, and combinations comprising at least one of the foregoing monomers. The $C_{1-8}$ alkyl (meth)acrylate monomers may optionally be polymerized in admixture with up to 15 wt % of comonomers of formulas (17), (18), or (19). Exemplary comonomers include but are not limited to butadiene, isoprene, styrene, methyl methacrylate, phenyl methacrylate, penethylmethacrylate, N-cyclohexylacrylamide, vinyl methyl ether, and mixtures comprising at least one of the foregoing comonomers. Optionally, up to 5 wt % a polyfunctional crosslinking comonomer may be present, for example divinylbenzene, alkylenediol di(meth) acrylates such as glycol bisacrylate, alkylenetriol tri(meth) acrylates, polyester di(meth)acrylates, bisacrylamides, triallyl cyanurate, triallyl isocyanurate, allyl (meth)acrylate, diallyl maleate, diallyl fumarate, diallyl adipate, triallyl esters of citric acid, triallyl esters of phosphoric acid, and the like, as well as combinations comprising at least one of the foregoing crosslinking agents.

The elastomer phase may be polymerized by mass, emulsion, suspension, solution or combined processes such as bulk-suspension, emulsion-bulk, bulk-solution or other techniques, using continuous, semibatch, or batch processes. The particle size of the elastomer substrate is not critical. For example, an average particle size of 0.001 to 25 micrometers, specifically 0.01 to 15 micrometers, or even more specifically 0.1 to 8 micrometers may be used for emulsion based polymerized rubber lattices. A particle size of 0.5 to 10 micrometers, specifically 0.6 to 1.5 micrometers may be used for bulk polymerized rubber substrates. Particle size may be measured by simple light transmittance methods or capillary hydrodynamic chromatography (CHDF). The elastomer phase may be a particulate, moderately cross-linked conjugated butadiene or $C_{4-6}$ alkyl acrylate rubber, and preferably has a gel content greater than 70 wt %. Also suitable are mixtures of butadiene with styrene and/or $C_{4-6}$ alkyl acrylate rubbers.

The elastomeric phase may provide 5 to 95 wt % of the total graft copolymer, more specifically 20 to 90 wt %, and even more specifically 40 to 85 wt % of the elastomer-modified graft copolymer, the remainder being the rigid graft phase.

The rigid phase of the elastomer-modified graft copolymer may be formed by graft polymerization of a mixture comprising a monovinylaromatic monomer and optionally one or more comonomers in the presence of one or more elastomeric polymer substrates. The above-described monovinylaromatic monomers of formula (18) may be used in the rigid graft phase, including styrene, alpha-methyl styrene, halostyrenes such as dibromostyrene, vinyltoluene, vinylxylene, butylstyrene, para-hydroxystyrene, methoxystyrene, or the like, or combinations comprising at least one of the foregoing monovinylaromatic monomers. Suitable comonomers include, for example, the above-described monovinylic monomers and/or monomers of the general formula (19). In one embodiment, R is hydrogen or $C_1$-$C_2$ alkyl, and $X^c$ is cyano or $C_1$-$C_{12}$ alkoxycarbonyl. Specific examples of suitable comonomers for use in the rigid phase include, methyl (meth)acrylate, ethyl (meth)acrylate, n-propyl (meth)acrylate, isopropyl (meth)acrylate, and the like, and combinations comprising at least one of the foregoing comonomers.

The relative ratio of monovinylaromatic monomer and comonomer in the rigid graft phase may vary widely depending on the type of elastomer substrate, type of monovinylaromatic monomer(s), type of comonomer(s), and the desired properties of the impact modifier. The rigid phase may generally comprise up to 100 wt % of monovinyl aromatic monomer, specifically 30 to 100 wt %, more specifically 50 to 90 wt % monovinylaromatic monomer, with the balance being comonomer(s).

Depending on the amount of elastomer-modified polymer present, a separate matrix or continuous phase of ungrafted rigid polymer or copolymer may be simultaneously obtained along with the elastomer-modified graft copolymer. Typically, such impact modifiers comprise 40 to 95 wt % elastomer-modified graft copolymer and 5 to 65 wt % graft (co) polymer, based on the total weight of the impact modifier. In another embodiment, such impact modifiers comprise 50 to 85 wt %, more specifically 75 to 85 wt % rubber-modified graft copolymer, together with 15 to 50 wt %, more specifically 15 to 25 wt % graft (co)polymer, based on the total weight of the impact modifier.

Another specific type of elastomer-modified impact modifier comprises structural units derived from at least one silicone rubber monomer, a branched acrylate rubber monomer having the formula $H_2C=C(R^d)C(O)OCH_2CH_2R^e$, wherein $R^d$ is hydrogen or a $C_1$-$C_8$ linear or branched alkyl group and $R^e$ is a branched $C_3$-$C_{16}$ alkyl group; a first graft link monomer; a polymerizable alkenyl-containing organic material; and a second graft link monomer. The silicone rubber monomer may comprise, for example, a cyclic siloxane, tetraalkoxysilane, trialkoxysilane, (acryloxy)alkoxysilane, (mercaptoalkyl)alkoxysilane, vinylalkoxysilane, or allylalkoxysilane, alone or in combination, e.g., decamethylcyclopentasiloxane, dodecamethylcyclohexasiloxane, trimethyltriphenylcyclotrisiloxane, tetramethyltetraphenylcyclotetrasiloxane, tetramethyltetravinylcyclotetrasiloxane, octaphenylcyclotetrasiloxane, octamethylcyclotetrasiloxane and/or tetraethoxysilane.

Exemplary branched acrylate rubber monomers include iso-octyl acrylate, 6-methyloctyl acrylate, 7-methyloctyl acrylate, 6-methylheptyl acrylate, and the like, alone or in combination. The polymerizable, alkenyl-containing organic material may be, for example, a monomer of formula (18) or (19), e.g., styrene, alpha-methylstyrene, or an unbranched (meth)acrylate such as methyl methacrylate, 2-ethylhexyl methacrylate, methyl acrylate, ethyl acrylate, n-propyl acrylate, or the like, alone or in combination.

The at least one first graft link monomer may be an (acryloxy)alkoxysilane, a (mercaptoalkyl)alkoxysilane, a vinylalkoxysilane, or an allylalkoxysilane, alone or in combination, e.g., (gamma-methacryloxypropyl) (dimethoxy)methylsilane and/or (3-mercaptopropyl)trimethoxysilane. The at least one second graft link monomer is a polyethylenically unsaturated compound having at least one allyl group, such as allyl methacrylate, triallyl cyanurate, or triallyl isocyanurate, alone or in combination.

The silicone-acrylate impact modifier compositions can be prepared by emulsion polymerization, wherein, for example at least one silicone rubber monomer is reacted with at least one first graft link monomer at a temperature from 30° C. to 110° C. to form a silicone rubber latex, in the presence of a surfactant such as dodecylbenzenesulfonic acid. Alternatively, a cyclic siloxane such as cyclooctamethyltetrasiloxane and tetraethoxyorthosilicate may be reacted with a first graft link monomer such as (gamma-methacryloxypropyl) methyldimethoxysilane, to afford silicone rubber having an average particle size from 100 nanometers to 2 micrometers. At least one branched acrylate rubber monomer is then polymerized with the silicone rubber particles, optionally in presence of a cross linking monomer, such as allylmethacrylate in the presence of a free radical generating polymerization catalyst such as benzoyl peroxide. This latex is then reacted with a polymerizable alkenyl-containing organic material and a second graft link monomer. The latex particles of the graft silicone-acrylate rubber hybrid may be separated from the aqueous phase through coagulation (by treatment with a coagulant) and dried to a fine powder to produce the silicone-acrylate rubber impact modifier composition. This method can be generally used for producing the silicone-acrylate impact modifier having a particle size from 100 nanometers to 2 micrometers.

Processes known for the formation of the foregoing elastomer-modified graft copolymers include mass, emulsion, suspension, and solution processes, or combined processes such as bulk-suspension, emulsion-bulk, bulk-solution or other techniques, using continuous, semibatch, or batch processes.

The foregoing types of impact modifiers, including SAN copolymers, can be prepared by an emulsion polymerization process that is free of basic materials such as alkali metal salts of $C_{6-30}$ fatty acids, for example sodium stearate, lithium stearate, sodium oleate, potassium oleate, and the like; alkali metal carbonates, amines such as dodecyl dimethyl amine, dodecyl amine, and the like; and ammonium salts of amines. Such materials are commonly used as surfactants in emulsion polymerization, and may catalyze transesterification and/or degradation of polycarbonates. Instead, ionic sulfate, sulfonate or phosphate surfactants may be used in preparing the impact modifiers, particularly the elastomeric substrate portion of the impact modifiers. Suitable surfactants include, for example, $C_{1-22}$ alkyl or $C_{7-25}$ alkylaryl sulfonates, $C_{1-22}$ alkyl or $C_{7-25}$ alkylaryl sulfates, $C_{1-22}$ alkyl or $C_{7-25}$ alkylaryl phosphates, substituted silicates, and mixtures thereof. A specific surfactant is a $C_{6-16}$, specifically a $C_{8-12}$ alkyl sulfonate. In the practice, any of the above-described impact modifiers may be used providing it is free of the alkali metal salts of fatty acids, alkali metal carbonates and other basic materials.

A specific impact modifier of this type is a methyl methacrylate-butadiene-styrene (MBS) impact modifier wherein the butadiene substrate is prepared using above-described sulfonates, sulfates, or phosphates as surfactants. Other examples of elastomer-modified graft copolymers besides ABS and MBS include but are not limited to acrylonitrile-styrene-butyl acrylate (ASA), methyl methacrylate-acrylonitrile-butadiene-styrene (MABS), and acrylonitrile-ethylene-propylene-diene-styrene (AES). When present, impact modifiers can be present in the thermoplastic composition in amounts of 0.1 to 30 percent by weight, based on the total weight of the polycarbonate and aromatic sulfonate compound.

The thermoplastic composition may include fillers or reinforcing agents. The fillers and reinforcing agents may desirably be in the form of nanoparticles, i.e., particles with a median particle size ($D_{50}$) smaller than 100 nm as determined using light scattering methods. Where used, suitable fillers or reinforcing agents include, for example, silicates and silica powders such as aluminum silicate (mullite), synthetic calcium silicate, zirconium silicate, fused silica, crystalline silica graphite, natural silica sand, or the like; boron powders such as boron-nitride powder, boron-silicate powders, or the like; oxides such as $TiO_2$, aluminum oxide, magnesium oxide, or the like; calcium sulfate (as its anhydride, dihydrate or trihydrate); calcium carbonates such as chalk, limestone, marble, synthetic precipitated calcium carbonates, or the like; talc, including fibrous, modular, needle shaped, lamellar talc, or the like; wollastonite; surface-treated wollastonite; glass spheres such as hollow and solid glass spheres, silicate spheres, cenospheres, aluminosilicate (armospheres), or the like; kaolin, including hard kaolin, soft kaolin, calcined kaolin, kaolin comprising various coatings known in the art to facilitate compatibility with the polymeric matrix resin, or the like; single crystal fibers or "whiskers" such as silicon carbide, alumina, boron carbide, iron, nickel, copper, or the like; fibers (including continuous and chopped fibers) such as asbestos, carbon fibers, glass fibers, such as E, A, C, ECR, R, S, D, or NE glasses, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper and nickel or the like; flaked fillers such as glass flakes, flaked silicon carbide, aluminum diboride, aluminum flakes, steel flakes or the like; fibrous fillers, for example short inorganic fibers such as those derived from blends comprising at least one of aluminum silicates, aluminum oxides, magnesium oxides, and calcium sulfate hemihydrate or the like; natural fillers and reinforcements, such as wood flour obtained by pulverizing wood, fibrous products such as cellulose, cotton, sisal, jute, starch, cork flour, lignin, ground nut shells, corn, rice grain husks or the like; organic fillers such as polytetrafluoroethylene; reinforcing organic fibrous fillers formed from organic polymers capable of forming fibers such as poly(ether ketone), polyimide, polybenzoxazole, poly(phenylene sulfide), polyesters, polyethylene, aromatic polyamides, aromatic polyimides, polyetherimides, polytetrafluoroethylene, acrylic resins, poly (vinyl alcohol) or the like; as well as additional fillers and reinforcing agents such as mica, clay, feldspar, flue dust, fillite, quartz, quartzite, perlite, tripoli, diatomaceous earth, carbon black, or the like, or combinations comprising at least one of the foregoing fillers or reinforcing agents.

The fillers and reinforcing agents may be coated with a layer of metallic material to facilitate conductivity, or surface treated with silanes to improve adhesion and dispersion with the polymeric matrix resin. In addition, the reinforcing fillers may be provided in the form of monofilament or multifilament fibers and may be used either alone or in combination with other types of fiber, through, for example, co-weaving or core/sheath, side-by-side, orange-type or matrix and fibril constructions, or by other methods known to one skilled in the art of fiber manufacture. Suitable cowoven structures include, for example, glass fiber-carbon fiber, carbon fiber-aromatic polyimide (aramid) fiber, and aromatic polyimide fiberglass fiber or the like. Fibrous fillers may be supplied in the form of, for example, rovings, woven fibrous reinforcements, such as 0-90 degree fabrics or the like; non-woven fibrous reinforcements such as continuous strand mat, chopped strand mat, tissues, papers and felts or the like; or three-dimensional reinforcements such as braids. Fillers can be used in amounts of 0 to 90 percent by weight, based on the total weight of the polycarbonate and aromatic sulfonate compound.

Suitable antioxidant additives include, for example, organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis [methylene(3,5-di-tert-butyl-4-hydroxyhydrocinnamate)] methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid or the like, or combinations comprising at least one of the foregoing antioxidants. Antioxidants can be used in amounts of 0.0001 to 1 percent by weight, based on the total weight of the polycarbonate and aromatic sulfonate compound.

Suitable heat stabilizer additives include, for example, organophosphites such as triphenyl phosphite, tris-(2,6-dimethylphenyl)phosphite, tris-(mixed mono-and di-nonylphenyl)phosphite or the like; phosphonates such as dimethylbenzene phosphonate or the like, phosphates such as trimethyl phosphate, or the like, or combinations comprising at least one of the foregoing heat stabilizers. Heat stabilizers can be used in amounts of 0.0001 to 1 percent by weight, based on the total weight of the polycarbonate and aromatic sulfonate compound.

Light stabilizers and/or ultraviolet light (UV) absorbing additives may also be used. Suitable light stabilizer additives include, for example, benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or the like, or combinations comprising at least one of the foregoing light stabilizers. Light stabilizers can be used in amounts of 0.0001 to 1 percent by weight, based on the total weight of the polycarbonate and aromatic sulfonate compound.

Suitable UV absorbing additives include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB® 5411); 2-hydroxy-4-n-octyloxybenzophenone (CYASORB® 531); 2-[4,6-bis(2,4-dimethylphenyl)-1,3,5-triazin-2-yl]-5-(octyloxy)-phenol (CYASORB® 1164); 2,2'-(1,4-phenylene)bis(4H-3,1-benzoxazin-4-one) (CYASORB® UV-3638); 1,3-bis[(2-cyano-3,3-diphenylacryloyl)oxy]-2,2-bis[[(2-cyano-3,3-diphenylacryloyl)oxy]methyl]propane (UVINUL® 3030); 2,2'-(1,4-phenylene)bis(4H-3,1-benzoxazin-4-one); 1,3-bis[(2-cyano-3,3-diphenylacryloyl)oxy]-2,2-bis[[(2-cyano-3,3-diphenylacryloyl)oxy]methyl]propane; nano-size inorganic materials such as titanium oxide, cerium oxide, and zinc oxide, all with particle size less than 100 nanometers; or the like, or combinations comprising at least one of the foregoing UV absorbers. UV absorbers can be used in amounts of 0.0001 to 1 percent by weight, based on the total weight of the polycarbonate and aromatic sulfonate compound.

Plasticizers, lubricants, and/or mold release agents additives may also be used. There is considerable overlap among these types of materials, which include, for example, phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl) phosphate of hydroquinone and the bis(diphenyl) phosphate of bisphenol-A; poly-alpha-olefins; epoxidized soybean oil; silicones, including silicone oils; esters, for example, fatty acid esters such as alkyl stearyl esters, e.g., methyl stearate; stearyl stearate, pentaerythritol tetrastearate, and the like; mixtures of methyl stearate and hydrophilic and hydrophobic nonionic surfactants comprising polyethylene glycol polymers, polypropylene glycol polymers, and copolymers thereof, e.g., methyl stearate and polyethylene-polypropylene glycol copolymers in a suitable solvent; waxes such as beeswax, montan wax, paraffin wax or the like. Such materials can be used in amounts of 0.001 to 1 percent by weight, specifically 0.01 to 0.75 percent by weight, more specifically 0.1 to 0.5 percent by weight, based on the total weight of the polycarbonate and aromatic sulfonate compound.

The term "antistatic agent" refers to monomeric, oligomeric, or polymeric materials that can be processed into polymer resins and/or sprayed onto materials or articles to improve conductive properties and overall physical performance. Examples of monomeric antistatic agents include glycerol monostearate, glycerol distearate, glycerol tristearate, ethoxylated amines, primary, secondary and tertiary amines, ethoxylated alcohols, alkyl sulfates, alkylarylsulfates, alkylphosphates, alkylaminesulfates, alkyl sulfonate salts such as sodium stearyl sulfonate, sodium dodecylbenzenesulfonate or the like, quaternary ammonium salts, quaternary ammonium resins, imidazoline derivatives, sorbitan esters, ethanolamides, betaines, or the like, or combinations comprising at least one of the foregoing monomeric antistatic agents.

Exemplary polymeric antistatic agents include certain polyesteramides polyether-polyamide (polyetheramide) block copolymers, polyetheresteramide block copolymers, polyetheresters, or polyurethanes, each containing polyalkylene glycol moieties polyalkylene oxide units such as polyethylene glycol, polypropylene glycol, polytetramethylene glycol, and the like. Such polymeric antistatic agents are commercially available, for example Pelestat® 6321 (Sanyo) or Pebax® MH1657 (Atofina), Irgastat® P18 and P22 (Ciba-Geigy). Other polymeric materials that may be used as antistatic agents are inherently conducting polymers such as polyaniline (commercially available as PANIPOL® EB from Panipol), polypyrrole, and polythiophenes such as for example poly(3,4-ethylenedioxythiophene) (commercially available from H. C. Stark), which retain some of their intrinsic conductivity after melt processing at elevated temperatures. In one embodiment, carbon fibers, carbon nanofibers, carbon nanotubes, carbon black, or any combination of the foregoing may be used in a polymeric resin containing chemical antistatic agents to render the composition electrostatically dissipative. Antistatic agents can be used in amounts of 0.0001 to 5 percent by weight, based on the total weight of the polycarbonate and aromatic sulfonate compound.

Suitable flame retardant that may be added may be organic compounds that include phosphorus, bromine, and/or chlorine. Non-brominated and non-chlorinated phosphorus-containing flame retardants may be preferred in certain applications for regulatory reasons, for example organic phosphates and organic compounds containing phosphorus-nitrogen bonds.

One type of exemplary organic phosphate is an aromatic phosphate of the formula $(GO)_3P=O$, wherein each G is independently an alkyl, cycloalkyl, aryl, alkylaryl, or arylalkyl group, provided that at least one G is an aromatic group. Two of the G groups may be joined together to provide a cyclic group, for example, diphenyl pentaerythritol diphosphate. Other suitable aromatic phosphates may be, for example, phenyl bis(dodecyl) phosphate, phenyl bis(neopentyl) phosphate, phenyl bis(3,5,5'-trimethylhexyl) phosphate, ethyl diphenyl phosphate, 2-ethylhexyl di(p-tolyl)phosphate, bis(2-ethylhexyl)p-tolyl phosphate, tritolyl phosphate, bis(2-ethylhexyl)phenyl phosphate, tri(nonylphenyl)phosphate, bis (dodecyl)p-tolyl phosphate, dibutyl phenyl phosphate, 2-chloroethyl diphenyl phosphate, p-tolyl bis(2,5,5'-trimethylhexyl)phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like.

Di- or polyfunctional aromatic phosphorus-containing compounds are also useful, for example, compounds of the formulas below:

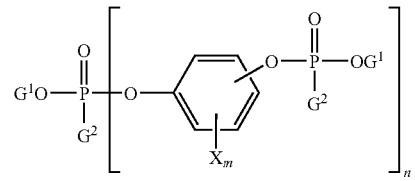

-continued

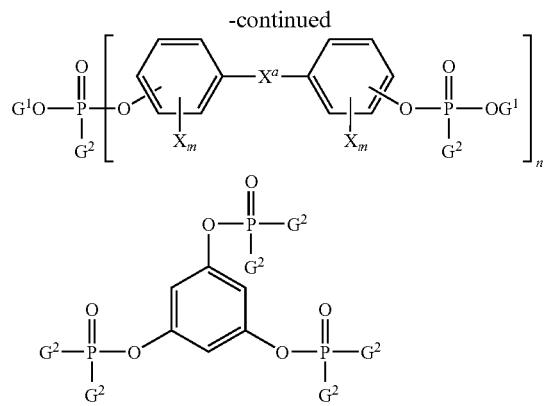

wherein each $G^1$ is independently a hydrocarbon having 1 to 30 carbon atoms; each $G^2$ is independently a hydrocarbon or hydrocarbonoxy having 1 to 30 carbon atoms; each $X^a$ is independently a hydrocarbon having 1 to 30 carbon atoms; each X is independently a bromine or chlorine; m is 0 to 4, and n is 1 to 30. Examples of suitable di- or polyfunctional aromatic phosphorus-containing compounds include resorcinol tetraphenyl diphosphate (RDP), the bis(diphenyl)phosphate of hydroquinone and the bis(diphenyl)phosphate of bisphenol-A, respectively, their oligomeric and polymeric counterparts, and the like.

Exemplary suitable flame retardant compounds containing phosphorus-nitrogen bonds include phosphonitrilic chloride, phosphorus ester amides, phosphoric acid amides, phosphonic acid amides, phosphinic acid amides, tris(aziridinyl)phosphine oxide. When present, phosphorus-containing flame retardants can be present in amounts of 0.1 to 10 percent by weight, based on the total weight of the polycarbonate and aromatic sulfonate compound.

Halogenated materials may also be used as flame retardants, for example halogenated compounds and resins of formula (20):

(20)

wherein R is an alkylene, alkylidene or cycloaliphatic linkage, e.g., methylene, ethylene, propylene, isopropylene, isopropylidene, butylene, isobutylene, amylene, cyclohexylene, cyclopentylidene, or the like; or an oxygen ether, carbonyl, amine, or a sulfur containing linkage, e.g., sulfide, sulfoxide, sulfone, or the like. R can also consist of two or more alkylene or alkylidene linkages connected by such groups as aromatic, amino, ether, carbonyl, sulfide, sulfoxide, sulfone, or the like.

Ar and Ar' in formula (20) are each independently mono- or polycarbocyclic aromatic groups such as phenylene, biphenylene, terphenylene, naphthylene, or the like.

Y is an organic, inorganic, or organometallic radical, for example: halogen, e.g., chlorine, bromine, iodine, fluorine; ether groups of the general formula OE, wherein E is a monovalent hydrocarbon radical similar to X; monovalent hydrocarbon groups of the type represented by R; or other substituents, e.g., nitro, cyano, and the like, said substituents being essentially inert provided that there is at least one and preferably two halogen atoms per aryl nucleus.

When present, each X is independently a monovalent hydrocarbon group, for example an alkyl group such as methyl, ethyl, propyl, isopropyl, butyl, decyl, or the like; an aryl groups such as phenyl, naphthyl, biphenyl, xylyl, tolyl, or the like; and arylalkyl group such as benzyl, ethylphenyl, or the like; a cycloaliphatic group such as cyclopentyl, cyclohexyl, or the like. The monovalent hydrocarbon group may itself contain inert substituents.

Each d is independently 1 to a maximum equivalent to the number of replaceable hydrogens substituted on the aromatic rings comprising Ar or Ar'. Each e is independently 0 to a maximum equivalent to the number of replaceable hydrogens on R. Each a, b, and c is independently a whole number, including 0. When b is not 0, neither a nor c may be 0. Otherwise either a or c, but not both, may be 0. Where b is 0, the aromatic groups are joined by a direct carbon-carbon bond.

The hydroxyl and Y substituents on the aromatic groups, Ar and Ar', can be varied in the ortho, meta or para positions on the aromatic rings and the groups can be in any possible geometric relationship with respect to one another.

Included within the scope of the above formula are bisphenols of which the following are representative: 2,2-bis-(3,5-dichlorophenyl)-propane; bis-(2-chlorophenyl)-methane; bis (2,6-dibromophenyl)-methane; 1,1-bis-(4-iodophenyl)-ethane; 1,2-bis-(2,6-dichlorophenyl)-ethane; 1,1-bis-(2-chloro-4-iodophenyl)ethane; 1,1-bis-(2-chloro-4-methylphenyl)-ethane; 1,1-bis-(3,5-dichlorophenyl)-ethane; 2,2-bis-(3-phenyl-4-bromophenyl)-ethane; 2,6-bis-(4,6-dichloronaphthyl)-propane; 2,2-bis-(2,6-dichlorophenyl)-pentane; 2,2-bis-(3,5-dibromophenyl)-hexane; bis-(4-chlorophenyl)-phenyl-methane; bis-(3,5-dichlorophenyl)-cyclohexylmethane; bis-(3-nitro-4-bromophenyl)-methane; bis-(4-hydroxy-2,6-dichloro-3-methoxyphenyl)-methane; and 2,2-bis-(3,5-dichloro-4-hydroxyphenyl)-propane 2,2 bis-(3-bromo-4-hydroxyphenyl)-propane. Also included within the above structural formula are: 1,3-dichlorobenzene, 1,4-dibromobenzene, 1,3-dichloro-4-hydroxybenzene, and biphenyls such as 2,2'-dichlorobiphenyl, polybrominated 1,4-diphenoxybenzene, 2,4'-dibromobiphenyl, and 2,4'-dichlorobiphenyl as well as decabromo diphenyl oxide, and the like.

Also useful are oligomeric and polymeric halogenated aromatic compounds, such as a copolycarbonate of bisphenol A and tetrabromobisphenol A and a carbonate precursor, e.g., phosgene. Metal synergists, e.g., antimony oxide, may also be used with the flame retardant. When present, halogen containing flame retardants can be present in amounts of 0.1 to 10 percent by weight, based on the total weight of the polycarbonate and aromatic sulfonate compound.

Inorganic flame retardants may also be used, for example salts of $C_{2-16}$ alkyl sulfonate salts such as potassium perfluorobutane sulfonate (Rimar salt), potassium perfluoroctane sulfonate, tetraethylammonium perfluorohexane sulfonate, and potassium diphenylsulfone sulfonate, and the like; salts formed by reacting for example an alkali metal or alkaline earth metal (for example lithium, sodium, potassium, magnesium, calcium and barium salts) and an inorganic acid complex salt, for example, an oxo-anion, such as alkali metal and alkaline-earth metal salts of carbonic acid, such as $Na_2CO_3$, $K_2CO_3$, $MgCO_3$, $CaCO_3$, and $BaCO_3$ or fluoro-anion complexes such as $Li_3AlF_6$, $BaSiF_6$, $KBF_4$, $K_3AlF_6$, $KAlF_4$, $K_2SiF_6$, and/or $Na_3AlF_6$ or the like. When present, inorganic flame retardant salts can be present in amounts of 0.1 to 5 percent by weight, based on the total weight of the polycarbonate and aromatic sulfonate compound.

Anti-drip agents may also be used, for example a fibril forming or non-fibril forming fluoropolymer such as polytetrafluoroethylene (PTFE). The anti-drip agent may be encapsulated by a rigid copolymer as described above, for example styrene-acrylonitrile copolymer (SAN). PTFE encapsulated in SAN is known as TSAN. Encapsulated fluoropolymers may be made by polymerizing the encapsulating polymer in the presence of the fluoropolymer, for example an aqueous dispersion. TSAN may provide significant advantages over PTFE, in that TSAN may be more readily dispersed in the composition. A suitable TSAN may comprise, for example, 50 wt % PTFE and 50 wt % SAN, based on the total weight of the encapsulated fluoropolymer. The SAN may comprise, for example, 75 wt % styrene and 25 wt % acrylonitrile based on the total weight of the copolymer. Alternatively, the fluoropolymer may be pre-blended in some manner with a second polymer, such as for, example, an aromatic polycarbonate resin or SAN to form an agglomerated material for use as an anti-drip agent. Either method may be used to produce an encapsulated fluoropolymer. Antidrip agents can be used in amounts of 0.1 to 5 percent by weight, based on the total weight of the polycarbonate and aromatic sulfonate compound.

While it is contemplated that other resins may be used in the thermoplastic compositions described herein, the aromatic sulfonate compounds are particularly suited for use in thermoplastic compositions that contain only polycarbonate-type resins as described herein (homopolycarbonates, copolyester carbonates, and combinations thereof). Thus, in an embodiment, a thermoplastic composition consists essentially of a polycarbonate resin and 0.1 to 5 mmol/Kg of an aromatic sulfonate compound, 0.2 to 4 mmol/Kg of an aromatic sulfonate compound, 0.3 to 3 mmol/Kg of an aromatic sulfonate compound, or 0.4 to 2.5 mmol/Kg of an aromatic sulfonate compound, each weight being based on the combined weight of the polycarbonate resin and the aromatic sulfonate compound, excluding any other additives and/or fillers. Alternatively, in an embodiment, a thermoplastic composition consists essentially of 99.75 to 99.999 wt % of a polycarbonate and 0.001 to 0.25 wt % of an aromatic sulfonate compound, 99.8 to 99.998 wt % of a polycarbonate and 0.002 to 0.2 wt % of a aromatic sulfonate compound, 99.85 to 99.997 wt % of a polycarbonate and 0.003 to 0.15 wt % of a aromatic sulfonate compound, 99.9 to 99.996 wt % of a polycarbonate and 0.004 to 0.1 wt % of a aromatic sulfonate compound or 99.905 to 99.995 wt % of a polycarbonate and 0.005 to 0.095 wt % of an aromatic sulfonate compound, wherein each of the foregoing weight percentages is based on the combined weight of the polycarbonate and the aromatic sulfonate compound, excluding any other additives and/or fillers.

In another embodiment, the thermoplastic composition further comprises 0.001 to 1 wt % of an aliphatic diol, based on the combined weight of the polycarbonate and the aromatic sulfonate compound. In another specific embodiment, the thermoplastic composition comprises 0.001 to 1 wt % of hydrolysis stabilizer, based on the combined weight of the polycarbonate and the aromatic sulfonate compound.

In a further embodiment, the thermoplastic composition may comprise an additive selected from impact modifier, filler, antioxidant, heat stabilizer, light stabilizer, ultraviolet light absorber, plasticizer, mold release agent, lubricant, antistatic agent, pigment, dye, flame retardant, anti-drip agent, or a combination comprising at least one of these.

The thermoplastic composition may be manufactured by methods generally available in the art, for example, in one embodiment, in one manner of proceeding, powdered polycarbonate, aromatic sulfonate compound, and other optional components including ionizing radiation stabilizing additive and/or hydrolysis stabilizer are first blended, in a HENSCHEL-Mixer® high speed mixer. Other low shear processes including but not limited to hand mixing may also accomplish this blending. The blend is then fed into the throat of an extruder via a hopper. Alternatively, one or more of the components may be incorporated into the composition by feeding directly into the extruder at the throat and/or downstream through a sidestuffer. The powdered polycarbonate, aromatic sulfonate compound, and other optional components including ionizing radiation stabilizing additive and/or hydrolysis stabilizer may also be compounded into a masterbatch and fed into the extruder and combined with additional polycarbonate and/or other polymers. The extruder is generally operated at a temperature higher than that necessary to cause the composition to flow. The extrudate is immediately quenched in a water batch and pelletized. The pellets, so prepared, when cutting the extrudate may be one-fourth inch long or less as desired. Such pellets may be used for subsequent molding, shaping, or forming.

In a specific embodiment, a method of preparing a thermoplastic composition comprises melt combining a polycarbonate and an aromatic sulfonate compound. The melt combining can be done by extrusion. In an embodiment, the proportions of polycarbonate and aromatic sulfonate compound are selected such that the optical properties of the thermoplastic composition are maximized while mechanical performance is at a desirable level. In a further specific embodiment, an ionizing radiation stabilizing additive is combined with the polycarbonate and aromatic sulfonate compound to make the thermoplastic composition. In a further specific embodiment, a hydrolysis stabilizer is also included. In an embodiment, the thermoplastic composition is prepared by melt-blending the masterbatch composition and a polycarbonate resin. In an embodiment, the proportions of polycarbonate, aromatic sulfonate compound, any added polycarbonate resin, and where desired, ionizing radiation stabilizing additive and/or hydrolysis stabilizer, are selected such that the optical properties of the thermoplastic composition are optimized while mechanical performance is at a desirable level.

In a specific embodiment, the extruder is a twin-screw extruder. The extruder is typically operated at a temperature of 180 to 385° C., specifically 200 to 330° C., more specifically 220 to 300° C., wherein the die temperature may be different. The extruded thermoplastic composition is quenched in water and pelletized.

Shaped, formed, or molded articles comprising the thermoplastic compositions are also provided. The thermoplastic compositions may be molded into useful shaped articles by a variety of means such as injection molding, extrusion, rotational molding, blow molding, thermoforming, or other methods such as melt casting or solvent casting. In a specific embodiment, molding is done by injection molding. Desirably, the thermoplastic composition has excellent mold filling capability and is useful to form articles such as, for example, bottles, syringes, dialysis fittings, tubing, sample vials, blood bags, petri dishes, beakers, centrifuge tubes, spatulas, connectors, trocars, stopcocks, luer locks, Y-sites, catheters, oxygenator housings, trays, dental instruments, pipettes, glucose meters, inhalers, and the like.

The thermoplastic composition is further illustrated by the following non-limiting examples.

All thermoplastic compositions were compounded on a Werner & Pfleiderer co-rotating twin screw extruder (Length/Diameter (L/D) ratio=30/1, vacuum port located near die face). The twin-screw extruder had enough distributive and dispersive mixing elements to produce good mixing of the polymer compositions. The compositions are subsequently molded according to ISO 294 on a Husky or BOY injection molding machine. Compositions were compounded and molded at a temperature of 250 to 330° C., though it will be recognized by one skilled in the art that the method is not limited to these temperatures.

The thermoplastic compositions are tested for the following properties. Yellowness Index (YI) for laboratory scale samples was determined using a Gretag MacBeth Color System at an illuminant observer of C/2°, in accordance with ASTM D1925-70 on 3.2±0.12 millimeter thick molded plaques. The increase in YI (dYI) is calculated by subtracting the yellowness index value of a non-irradiated sample from that of an irradiated sample of the same composition. Molecular weight change was tested under conditions of either heat at 80° C. in a dry, nitrogen purged oven, or heat and moisture at 80° C. and 80% relative humidity (80/80), according to the following procedure: a 100 gram sample of the polycarbonate was placed in either an oven at 80° C. plus or minus 3° C., and a relative humidity of 80% was established by introduction of water vapor; alternatively, an oven was preheated to 80° C., and stream of dry air was purged through the chamber. The sample was maintained at the desired temperature for 2 weeks (wk). The sample was removed from the oven, dissolved in methylene chloride, diluted to a concentration of 1 mg/ml, and was analyzed by gel permeation chromatography using a crosslinked styrene-divinylbenzene column and calibrated against polycarbonate standards. The difference in weight averaged molecular weight is determined from a comparison of the weight averaged molecular weights of a sample and control.

Polycarbonate compositions for the examples (abbreviated Ex. in the following tables) and comparative examples (abbreviated CEx. in the following tables) were prepared using the components shown in Table 1. Each of the polycarbonate compositions were formulated to contain a mold release additive (0.27 wt % PETS), antioxidant (0.027 wt % Irgafos® 1-168), and unless otherwise noted contain alkylene diol (0.15 wt % MPD). The polycarbonate resins and additives were blended in a powder mixer, extruded on a twin-screw extruder, and injection molded into flat, rectangular plaques of 3.2±0.12 mm thickness, using the equipment described above. For testing of resistance to yellowing, the plaques were sealed and subjected to high-energy (gamma) irradiation, YI was measured as soon as the plaques were exposed to the atmosphere, and dYI was calculated according to the procedure above.

TABLE 1

| BPA-PC | BPA polycarbonate resin (MVR = 17.5 g/10 min at 300° C.) | GE Plastics |
|---|---|---|
| ITR-PC | (19 mol % isophthalate-terephthalate-resorcinol)-co-(75 mol % bisphenol-A polycarbonate-co-6 mol % resorcinol polycarbonate) copolymer (Mw = 30,100 g/mol, PC standards) | GE Plastics |
| PTP | 4,4-Bis-(phenyl-p-toluenesulfonate)-2,2-propane | See Procedure, below |
| PDT | 1,4-Phenyl-ditosylate | See Procedure, below |
| 1,3,5-PTT | Phloroglucinyl-tris-(tosylate) | See Procedure, below |
| 1,2,3-PTT | Pyrogallol-tris-(tosylate) | See Procedure, below |
| PTMB | Pyrogallol-tris(4-methoxy-benzene-sulfonate) | See Procedure, below |
| PTOS | Pyrogallol-tris(octanesulfonate) | See Procedure, below |

TABLE 1-continued

| PT | Phenyl tosylate, 98% purity | TCI Americas Inc. |
|---|---|---|
| MPD | 2-Methyl-2,4-pentanediol (hexylene glycol), 99% purity | Aldrich Chemical Co. |
| PETS | Pentaerythritol tetrastearate (plasticizer/mold release agent) | FACI Farasco, Genova, Italy |
| I-168 | IRGAFOS ® 168 Antioxidant (Tris (2,6-di-tert-butylphenyl)phosphite) | Ciba Specialty Chemicals |
| ERL-4221 | Cycloaliphatic Epoxide Resin ERL-4221 | Union Carbide Corporation |
| ADR-4368 | JONCRYL ® ADR-4368 hydrolysis stabilizer | Johnson Polymer |

The aromatic sulfonate compounds 4-bis-(phenyl-p-toluenesulfonate)-2,2-propane (PTP), 1,4-phenyl-ditosylate (PDT), phloroglucinyl-tris-(tosylate)(1,3,5-PTT), pyrogallol-tris-(tosylate)(1,2,3-PTT), pyrogallol-tris(4-acetyl-benzenesulfonate) (PTAB), pyrogallol-tris(4-methoxy-benzenesulfonate) (PTMB), and pyrogallol-tris (octanesulfonate) (PTOS) were prepared according to the procedures below.

4,4-Bis-(phenyl-p-toluenesulfonate)-2,2-propane (PTP). Into a 500 ml three-necked round-bottom flask equipped with a magnetic stirrer, was charged TsCl (10.0 g, 0.052 mol), BPA (5.38 g, 0.024 mol), and tetrahydrofuran (THF) (300 ml). Into this solution, TEA (5.61 g, 0.055 mol) was added drop-wise via an addition funnel over a period of 5 min. After the addition of TEA, the solution was stirred for an additional 15 min. The triethylamine hydrochloride was filtered and the THF was removed in vacuo. The crude product was diluted into 200 ml of $CH_2Cl_2$ and subsequently transferred to a 500 ml separatory funnel. The solution was washed with 100 ml of 0.1 M NaOH (2×), 100 ml of 1.0 M HCl (2×), and 100 ml of deionized water (2×). The methylene chloride layer was extracted, dried over $MgSO_4$ for 1 hour, and filtered. The methylene chloride was removed in vacuo, and a viscous oil was recovered. The viscous oil was diluted with a minimal amount of methylene chloride and crystallized from hexanes to afford PTP as white crystals. The crystals were collected and dried in vacuo (30 mm Hg) overnight.

1,4-Phenyl-ditosylate (PDT). Into a 500 ml three-necked round-bottom flask equipped with a magnetic stirrer, was charged TsCl (20.0 g, 0.105 mol), hydroquinone (5.0 g, 0.045 mol), methylene chloride (400 ml), and THF (50 ml). Into this solution, TEA (10.8 g, 0.106 mol) was added drop-wise via an addition funnel over a period of 10 min. After the addition of TEA, the solution was stirred for an additional 2 hours and subsequently transferred to a 1000 ml separatory funnel. The solution was washed with 150 ml of 1.0 M HCl (1×), 100 ml of 0.1 M NaOH (2×), 100 ml of 1.0 M HCl (1×), and 100 ml of deionized water (2×). The methylene chloride layer was extracted, dried over $MgSO_4$ for 1 hour, and filtered. The methylene chloride was removed in vacuo, and a viscous oil was recovered. The viscous oil was diluted with a minimal amount of methylene chloride and crystallized from hexanes to afford PDT as white crystals. The crystals were collected and dried in vacuo (30 mm Hg) overnight.

Phloroglucinyl-tris-(tosylate)(1,3,5-PTT). Into a 500 ml three-necked round-bottom flask equipped with a magnetic stirrer, was charged TsCl (20.0 g, 0.105 mol), phloroglucinol, (4.26 g, 0.033 mol), methylene chloride (400 ml), and THF (50 ml). Into this solution, TEA (13.2 g, 0.13 mol) was added drop-wise via an addition funnel over a period of 10 min. After the addition of TEA, the solution was stirred for an additional 15 min and subsequently transferred to a 1000 ml separatory funnel. The solution was washed with 150 ml of 1.0 M HCl (1×), 100 ml of 0.1 M NaOH (2×), 100 ml of 1.0 M HCl (1×), and 100 ml of deionized water (3×). The methylene chloride layer was extracted, dried over MgSO$_4$ for 1 hour, and filtered. The methylene chloride was removed in vacuo, and a viscous oil was recovered. The viscous oil was diluted with a minimal amount of methylene chloride and crystallized from methanol to afford 1,3,5-PTT as white crystals. The crystals were collected and dried in vacuo (30 mm Hg) overnight.

Pyrogallol-tris-(tosylate)(1,2,3-PTT). Into a 500 ml three-necked round-bottom flask equipped with a magnetic stirrer, was charged TsCl (10.0 g, 0.052 mol), pyrogallol (2.1 g, 0.017 mol), methylene chloride (300 ml), and THF (50 ml). Into this solution, TEA (5.26 g, 0.052 mol) was added drop-wise via a syringe over a period of 5 min. After the addition of TEA, the solution was stirred for an additional 2 hours and subsequently transferred to a 1000 ml separatory funnel. The solution was washed with 150 ml of 1.0 M HCl (1×), 100 ml of 0.1 M NaOH (2×), 100 ml of 1.0 M HCl (1×), and 100 ml of deionized water (2×). The methylene chloride layer was extracted, dried over MgSO$_4$ for 1 hour, and filtered. The methylene chloride was removed in vacuo, and a viscous oil was recovered. The viscous oil was diluted with a minimal amount of methylene chloride and crystallized from hexanes to afford 1,2,3-PTT as white crystals. The crystals were collected and dried in vacuo (30 mm Hg) overnight.

Pyrogallol-tris(4-acetyl-benzenesulfonate) (PTAB). Into a 500 ml three-necked round-bottom flask equipped with a magnetic stirrer, was charged 4-acetyl-benzenesulfonyl chloride (10.0 g, 0.045 mol), pyrogallol (1.9 g, 0.015 mol), methylene chloride (300 ml), and THF (50 ml). Into this solution, TEA (4.7 g, 0.046 mol) was added drop-wise via a syringe over a period of 5 min. After the addition of TEA, the solution was stirred for an additional 2 hours and subsequently transferred to a 1000 ml separatory funnel. The solution was washed with 150 ml of 1.0 M HCl (1×), 100 ml of 0.1 M NaOH (2×), 100 ml of 1.0 M HCl (1×), and 100 ml of deionized water (2×). The methylene chloride layer was extracted, dried over MgSO$_4$ for 1 hour, and filtered. The methylene chloride was removed in vacuo, and a viscous oil was recovered. The viscous oil was diluted with a minimal amount of methylene chloride and crystallized from hexanes to afford PTAB as white crystals. The crystals were collected and dried in vacuo (30 mm Hg) overnight.

Pyrogallol-tris(4-methoxy-benzenesulfonate) (PTMB). Into a 500 ml three-necked round-bottom flask equipped with a magnetic stirrer, was charged 4-methoxy-benzenesulfonyl chloride (10.0 g, 0.048 mol), pyrogallol (1.97 g, 0.016 mol), methylene chloride (300 ml), and THF (50 ml). Into this solution, TEA (4.9 g, 0.048 mol) was added drop-wise via a syringe over a period of 5 min. After the addition of TEA, the solution was stirred for an additional 2 hours and subsequently transferred to a 1000 ml separatory funnel. The solution was washed with 150 ml of 1.0 M HCl (1×), 100 ml of 0.1 M NaOH (2×), 100 ml of 1.0 M HCl (1×), and 100 ml of deionized water (2×). The methylene chloride layer was extracted, dried over MgSO$_4$ for 1 hour, and filtered. The methylene chloride was removed in vacuo, and a viscous oil was recovered. The viscous oil was diluted with a minimal amount of methylene chloride and crystallized from hexanes to afford PTMB as white crystals. The crystals were collected and dried in vacuo (30 mm Hg) overnight.

Pyrogallol-tris(octanesulfonate) (PTOS). Into a 500 ml three-necked round-bottom flask equipped with a magnetic stirrer, was charged octanesulfonyl chloride (10.0 g, 0.047 mol), pyrogallol (1.9 g, 0.015 mol), methylene chloride (300 ml), and THF (50 ml). Into this solution, TEA (5.0 g, 0.049 mol) was added drop-wise via a syringe over a period of 5 min. After the addition of TEA, the solution was stirred for an additional 2 hours and subsequently transferred to a 1000 ml separatory funnel. The solution was washed with 150 ml of 1.0 M HCl (1×), 100 ml of 0.1 M NaOH (2×), 100 ml of 1.0 M HCl (1×), and 100 ml of deionized water (2×). The methylene chloride layer was dried over MgSO$_4$ for 1 hour and filtered. The methylene chloride was removed in vacuo, and a viscous oil recovered. The viscous oil was diluted with a minimal amount of methylene chloride and crystallized from hexanes to afford PTOS as white crystals. The crystals were collected and dried in vacuo (30 mm Hg) overnight.

Examples 1-7 and Comparative Examples 1-7. Sulfonates and 0.15 wt % MPD were blended with BPA-PC polycarbonate resin according to the ratios described in Table 2, below. All examples and comparative examples contain 0.27 wt % PETS (plasticizer/mold release agent) and 0.027 wt % Irgafos® I-168 (antioxidant). The pellets were injection molded on a BOY injection molding machine into rectangular 3.2±0.12 mm thick plaques that were placed into a sealed package to prevent contact with light and moisture. The plaques were then subjected to high energy irradiation at nominal doses of 25, 50, or 75 kiloGrays (kGy) (common for sterilization; actual doses are reported in the tables), and subsequently measured for the change in yellowness index (dYI) according to the method described above which uses YI measurements according to ASTM D1925-70. Table 3 shows the dYI data for the examples after exposure to high energy gamma irradiation.

The compositions described in Table 2 were molded into plaques and evaluated for different mechanical, thermal, and physical properties. A comparison of the resulting data is provided in Table 2. (Doses reported with the data are actual measured doses, and correspond to the nominal doses as shown in the Table 2 notes).

TABLE 2*

| Example | Compound | Sulfonate Loading (mmol/Kg) | dYI (32 kGy[1]) | dYI (59 kGy[1]) |
|---|---|---|---|---|
| Comp. Ex. 1 | — | 0 | 5.6 | 9.7 |
| Comp. Ex. 2 | PTs | 1 | 6.6 | 9.7 |
| Comp. Ex. 3 | PTs | 2 | 8.3 | 11.1 |
| Comp. Ex. 4 | PTP | 1 | 5.6 | 10.0 |
| Comp. Ex. 5 | PTP | 2 | 5.2 | 9.5 |
| Comp. Ex. 6 | PDT | 1 | 5.5 | 10.2 |
| Comp. Ex. 7 | PDT | 2 | 4.7 | 9.1 |
| Ex. 1 | 1,3,5-PTT | 1 | 4.9 | 9.1 |
| Ex. 2 | 1,2,3-PTT | 1 | 4.4 | 7.8 |
| Ex. 3 | 1,2,3-PTT | 2 | 4.3 | 7.4 |
| Ex. 4 | PTAB | 2 | 0.7 | 4.7 |
| Ex. 5 | PTMB | 2 | 3.1 | 7.4 |
| Ex. 6 | PTOS | 1 | 4.9 | 8.1 |
| Ex. 7 | PTOS | 2 | −1.7 | 2.3 |

*All examples and comparative examples contain 0.15 wt % MPD.
[1]Irradiation doses reported in kiloGrays (kGy) are actual doses. A 25 kGy nominal dose gave a 32 kGy actual dose; and a 50 kGy nominal dose gave a 59 kGy actual dose.
[2]dYI values represent gain in YI compared to before-irradiation samples. A negative value indicates a loss in YI.

Examples 1-7 all show improved resistance to increase in dYI after exposure to high energy dosages compared to Comparative Example 1, which does not contain a sulfonate additive. The monofunctional (PT; Comparative Examples 2 and 3), and difunctional aromatic tosylates (PTP and PDT; Comparative Examples 4-7) did not show a significant improvement in resistance to increase in dYI in comparison to the control. For the tri-functional tosylates, the tosylates based on pyrogallol (1,2,3-PTT; Examples 2 and 3) show a greater resistance to increase in dYI than the tri-tosylate of phloroglucinol (Example 1). Examples 6 and 7, prepared with 1,2, 3-trifunctional aromatic-alkylsulfonate (PTOS), appear to exhibit the greatest resistance to increase in dYI; however, the initial YI of the polycarbonate composition containing PTOS was nearly twice the YI of any of the polycarbonate compositions containing sulfonate additives, presumably due to thermal degradation of the alkyl moiety during extrusion and injection molding (as found using thermogravimetric analysis (TGA)). In most of the cases, doubling the sulfonate concentration improved the dYI slightly, but not significantly. Thus, Examples 9 and 10 (PTOS) showed the most significant improvement in the dYI with a doubling the concentration of the PTOS from 1 mmol/Kg to 2 mmol/Kg.

Examples 8-15 and Comparative Examples 8-11 were prepared according to the ratios in Table 3 to examine the effect of the presence or absence of aliphatic diol (MPD) in a polycarbonate composition comprising BPA-PC or ITR-PC and 1,2,3-PTT. The materials were blended, extruded on a twin-screw extruder, and injection-molded into flat, rectangular 3.2±0.12 mm thick plaques, as described above. The dYI was determined for post gamma-irradiation of samples (nominal 25, 50, and 75 kGy irradiation doses; actual dose is noted in Table 3) using ASTM D1925-70. The data are given in Table 3.

TABLE 3

| Resin | 1,2,3-PTT loading (mmol/Kg) | MPD (wt %) | dYI (32 kGy)[1,2] | dYI (51 kGy)[1,2] | dYI (83 kGy)[1,2] |
|---|---|---|---|---|---|
| CEx. 8 | BPA-PC | 0 | 0 | 16.7 | 31.0 | 43.6 |
| CEx. 9 | BPA-PC | 0 | 0.1 | 9.1 | 16.2 | 29.7 |
| CEx. 10 | BPA-PC | 0 | 0.15 | — | — | 47 |
| Ex. 8 | BPA-PC | 1 | 0 | — | — | 21 |
| Ex. 9 | BPA-PC | 1 | 0 | 10.4 | 16.6 | 23.1 |
| Ex. 10 | BPA-PC | 2 | 0 | — | — | 19 |
| Ex. 11 | BPA-PC | 1 | 0.15 | — | — | 11 |
| Ex. 12 | BPA-PC | 2 | 0.15 | — | — | 11 |
| CEx. 11 | BPA-PC/ITR | 0 | 0.15 | 8 | 13.3 | 19.9 |
| Ex. 13 | BPA-PC/ITR | 1 | 0 | 8.2 | 12.7 | 18.3 |
| Ex. 14 | BPA-PC/ITR | 2 | 0 | 6.8 | 10.3 | 14.1 |
| Ex. 15 | BPA-PC/ITR | 2 | 0.15 | 2.5 | 4.4 | 6.6 |

[1]Irradiation doses reported in kiloGrays (kGy) are actual doses. A 25 kGy nominal dose gave a 32 kGy actual dose; a 50 kGy nominal dose gave a 51 kGy actual dose; and a 75 kGy nominal dose gave an 83 kGy actual dose.
[2]dYI values represent gain in YI compared to before-irradiation samples. A negative value indicates a loss in YI.

The data show that a polycarbonate resin that contains a combination of MPD and a tri-functional tosylate (1,2,3-PTT) experiences a synergistic decrease in the dYI (Examples 11, 12, and 15) when compared to a similar polycarbonate material containing only the tri-functional tosylate (Examples 8-10, 13, and 14). Increasing the concentration of tosylate from 1 to 2 mmol/Kg did not significantly alter the dYI (post-irradiation). Of note, the ITR-PC examples (Examples 13-15, and Comparative Example 11) have a lower baseline dYI at all exposure doses than the BPA-PC examples with corresponding additive loadings. Example 15, prepared using ITR-PC with both MPD and 1,2,3-PTT added, shows the lowest dYI (and hence the highest stability) of the examples in Table 3.

Examples 16-22 and Comparative Examples 12 and 13. These examples were prepared with BPA-PC, a multi-functional tosylate, 0.15 wt % MPD, and a hydrolysis stabilizer. Typically, the hydrolysis stabilizer is added to prevent or mitigate loss of molecular weight resulting from exposure of the polycarbonate compositions to an environment of elevated temperature and elevated humidity. The hydrolysis stabilizers used were either ERL-4221 or ADR-4368. The thermoplastic compositions were blended, extruded, molded into plaques for testing, and irradiated according to the procedure described above. Identical plaques were placed into an oven for environmental exposure at either 80° C. or a combination of 80° C. and 80% humidity, as described above. The composition and data are given in Table 4.

TABLE 4

| | Sulfonate | Sulfonate Load (wt %) | Hydr. Stab. | Hydr. Stab. Load (wt %) | dYI (post 51 kGy; gain)[1,2] | dYI (post 83 kGy; gain)[1,2] | % Mw loss (post-51 kGy 2 wk, 80° C./80% RH)[1,3] | % Mw loss (post-51 kGy irradiation, 2 wk, 80° C.)[1,3] |
|---|---|---|---|---|---|---|---|---|
| CEx. 12 | — | 0 | — | 0 | 15.1 | 45.4 | 7 | 5.4 |
| CEx. 13 | — | 0 | ADR 4368 | 0.25 | 14.7 | 36.4 | 8.2 | 5.4 |
| Ex. 16 | 1,3,5-PTT | 0.06‡ | — | 0 | 12.4 | 38 | 20.2 | 8 |
| Ex. 17 | 1,3,5-PTT | 0.06‡ | ADR 4368 | 0.125 | 12.9 | 30.5 | 21.2 | 7.2 |
| Ex. 18 | 1,3,5-PTT | 0.06‡ | ADR 4368 | 0.25 | 12.7 | 31 | 18.7 | 5.8 |
| Ex. 19 | 1,3,5-PTT | 0.06‡ | ERL-4221 | 0.1 | 13.0 | 30.5 | 14.4 | 6.4 |
| Ex. 20 | 1,2,3-PTT | 0.06‡ | — | 0 | 6.8 | 12.4 | 30.4 | 15.9 |

TABLE 4-continued

|  | Sulfonate | Sulfonate Load (wt %) | Hydr. Stab. | Hydr. Stab. Load (wt %) | dYI (post 51 kGy; gain)[1,2] | dYI (post 83 kGy; gain)[1,2] | % Mw loss (post-51 kGy 2 wk, 80° C./80% RH)[1,3] | % Mw loss (post-51 kGy irradiation, 2 wk, 80° C.)[1,3] |
|---|---|---|---|---|---|---|---|---|
| Ex. 21 | 1,2,3-PTT | 0.06[‡] | ADR 4368 | 0.25 | 7.0 | 12.7 | 26.4 | 15 |
| Ex. 22 | 1,2,3-PTT | 0.06[‡] | ERL-4221 | 0.1 | 6.6 | 12.1 | 28 | 11.8 |

[‡]0.06 wt % of PTT (1,3,5- or 1,2,3-isomers) = 1.02 mmol/Kg
[1]Irradiation doses reported in kiloGrays (kGy) are actual doses. A 50 kGy nominal dose gave a 51 kGy actual dose; and a 75 kGy nominal dose gave an 83 kGy actual dose.
[2]dYI values represent gain in YI compared to before-irradiation samples. A negative value indicates a loss in YI.
[3]% Mw loss represents loss in value compared to before-irradiation samples. A negative value indicates a loss in YI.

Examples 16-19 (with 1,3,5-PTT) show a marginal improvement over the Comparative Examples 12 and 13 after irradiation by gamma rays, and a further slight improvement in the dYI with an added epoxide stabilizer (Examples 17-19). Examples 20-22 (with 1,2,3-PTT) have a low dYI compared to Comparative Examples 12 and 13, but the addition of epoxide stabilizer (Examples 21 and 22) did not appreciably affect the dYI. In all cases, the epoxide additives did not significantly improve the hydrolytic stability of the polycarbonate resin. It is believed that the epoxide moieties may be reacting with other high-energy species that are formed during the gamma irradiation of polycarbonate, mitigating their usefulness as hydrolysis stabilizers when exposed to heat and moisture, post-irradiation.

Generally, the data above show that low color or colorless articles (i.e., having low or no added colorant) having good optical properties such as low yellowness and were desired, high transparency, may be prepared using the thermoplastic compositions described herein. Such articles can maintain these desired properties after irradiation at high doses (up to 83 kGy) of gamma radiation.

Compounds are described herein using standard nomenclature. A dash ("—") that is not between two letters or symbols is used to indicate a point of attachment for a substituent. For example, —CHO is attached through the carbon of the carbonyl (C═O) group. The singular forms "a," "an," and "the" include plural referents unless the context clearly dictates otherwise. The endpoints of all ranges reciting the same characteristic or component are independently combinable and inclusive of the recited endpoint. All references are incorporated herein by reference. The terms "first," "second," and the like herein do not denote any order, quantity, or importance, but rather are used to distinguish one element from another.

While typical embodiments have been set forth for the purpose of illustration, the foregoing descriptions should not be deemed to be a limitation on the scope herein. Accordingly, various modifications, adaptations, and alternatives may occur to one skilled in the art without departing from the spirit and scope herein.

We claim:

1. A thermoplastic composition comprising:
   a polycarbonate, and
   an aromatic sulfonate compound of formula

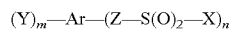

wherein
   each X is independently a substituted or unsubstituted $C_1$-$C_{20}$ alkyl, substituted or unsubstituted $C_1$-$C_{20}$ arylalkyl, substituted or unsubstituted $C_6$-$C_{20}$ aryl, or substituted or unsubstituted $C_7$-$C_{40}$ alkylaryl,
   Z is —O— or substituted or unsubstituted —(—O—$C_{1-20}$—)$_w$—O—, wherein w is 1 to 20,
   Ar is a $C_6$-$C_{62}$ aromatic group; m is 0-3 and n is 3-6; and each Y is independently $C_1$-$C_{20}$ alkyl, substituted $C_1$-$C_{20}$ alkyl, $C_6$-$C_{20}$ aryl, $C_1$-$C_8$ alkyl-substituted $C_6$-$C_{20}$ aryl, halogen, nitro, $C_1$-$C_{20}$ alkoxycarbonyl, $C_1$-$C_{20}$ alkoxy, or $C_1$-$C_{20}$ acyl, and
   a ionizing radiation stabilizing additive,
   wherein a molded article having a thickness of 3.2±0.12 millimeters and consisting of the polycarbonate, aromatic sulfonate compound, and an effective amount of each of a mold-release agent and an antioxidant has, after exposure to a total gamma radiation dose of 83 kGy and when measured according to ASTM D1925-70, an increase in yellowness index (dYI) of less than or equal to 45, when compared to the unexposed molded article.

2. The thermoplastic composition of claim 1, comprising 0.001 to 500 mmol/Kg of the aromatic sulfonate compound, based on the total weight of the polycarbonate and aromatic sulfonate compound.

3. The thermoplastic composition of claim 1, comprising 0.001 to 5 mmol/Kg of the aromatic sulfonate compound, with the proviso that the amount of aromatic sulfonate compound does not exceed 0.5 wt% of the total weight of the polycarbonate and aromatic sulfonate compound.

4. The thermoplastic composition of claim 1, wherein Ar is a $C_6$ aromatic group having a valency of m+n, and wherein m+n is 6.

5. The thermoplastic composition of claim 4, wherein at least two of the —Z—S(O)$_2$—X groups are substituted ortho to each other on the $C_6$ aromatic group.

6. The thermoplastic composition of claim 1, wherein the ionizing radiation stabilizing additive is an aliphatic alcohol, an aromatic alcohol, an aliphatic diol, an aliphatic polyol, an aliphatic ether, an ester, a diketone, an alkene, a thiol, thioethers, a cyclic thioether, a sulfone, a dihydroaromatic, a diether, a nitrogen compound, or a combination comprising at least one of the foregoing.

7. The thermoplastic composition of claim 6 wherein the aliphatic diol has the structure:

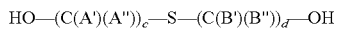

wherein A', A", B', and B" are each individually H or $C_1$-$C_6$ alkyl; and wherein S is $C_1$- $C_{20}$ alkyl, $C_2$-$C_{20}$ alkyleneoxy, $C_3$-$C_6$ cycloalkyl, or $C_3$-$C_6$ substituted cycloalkyl; and wherein c and d are each 0 or 1, with the proviso that, where c and d are each 0, S is selected such that both —OH groups are not connected directly to a single common carbon atom.

8. The thermoplastic composition of claim 6, wherein a molded article having a thickness of 3.2±0.12 millimeters and consisting of polycarbonate, aromatic sulfonate compound, aliphatic diol, and an effective amount of each of a mold release agent and an antioxidant has, after exposure to a total gamma radiation dose of 83 kGy and when measured according to ASTM D1925-70, an increase in yellowness index (dYI) of less than or equal to 29, when compared to the unexposed molded article.

9. The thermoplastic composition of claim 6, wherein a molded article having a thickness of 3.2±0.12 millimeters and consisting of polycarbonate, aromatic sulfonate compound, aliphatic diol, and an effective amount of each of a mold-release agent and an antioxidant has, after exposure to a total gamma radiation dose of 59 kGy and when measured according to ASTM D1925-70, an increase in yellowness index (dYI) of less than or equal to 9, when compared to the unexposed molded article.

10. The thermoplastic composition of claim 6, wherein a molded article having a thickness of 3.2±0.12 millimeters and consisting of polycarbonate, aromatic sulfonate compound, aliphatic diol, hydrolysis stabilizer, and an effective amount of each of a mold-release agent and an antioxidant has, after exposure to a total gamma radiation dose of 32 kGy and when measured according to ASTM D1925-70, an increase in yellowness index (dYI) of less than or equal to 5, when compared to the unexposed molded article.

11. The thermoplastic composition of claim 6, further comprising a hydrolysis stabilizer, wherein a molded article having a thickness of 3.2±0.12 millimeters and consisting of polycarbonate, aromatic sulfonate compound, aliphatic diol, hydrolysis stabilizer, and an effective amount of each of a mold-release agent and an antioxidant has, after exposure to a total gamma radiation dose of 83 kGy and when measured according to ASTM D1925-70, an increase in yellowness index (dYI) of less than or equal to 35, when compared to the unexposed molded article.

12. The thermoplastic composition of claim 11, wherein a molded article having a thickness of 3.2±0.12 millimeters and consisting of polycarbonate, aromatic sulfonate compound, aliphatic diol, hydrolysis stabilizer, and an effective amount of each of a mold-release agent and an antioxidant has, after exposure to a total gamma radiation dose of 51 kGy and when measured according to ASTM D1925-70, an increase in yellowness index (dYI) of less than or equal to 13, when compared to the unexposed molded article.

13. The thermoplastic composition of claim 1, further comprising an impact modifier, filler, antioxidant, heat stabilizer, light stabilizer, ultraviolet light absorber, plasticizer, mold release agent, lubricant, antistatic agent, pigment, dye, flame retardant, anti-drip agent, or a combination comprising at least one of these.

14. The thermoplastic composition of claim 13 wherein the pigment is Pigment Blue 15:4, Pigment Blue 28, or a combination comprising at least one of the foregoing.

15. The thermoplastic composition of claim 1 wherein the aromatic sulfonate compound is 1,3,5-tri-(4-toluenesulfonyl) benezene, 1,2,3-tri-(4-toluenesulfonyl) benezene, 1,2,3-tri-(4-acetylbenzenesulfonyl) benezene, 1,2,3-tri-(4- tmethoxybenzenesulfonyl) benezene, 1,2,3-tri-(n-octanesulfonyl) benezene, or a combination comprising at least one of the foregoing.

16. A thermoplastic composition comprising:
a polycarbonate, and
0.001 to 500 mmol/Kg of an aromatic sulfonate compound of formula

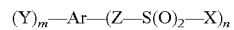

wherein each X is independently a substituted or unsubstituted $C_1$-$C_{20}$ alkyl, substituted or unsubstituted $C_1$-$C_{20}$ arylalkyl, substituted or unsubstituted $C_6$-$C_{20}$ aryl, or substituted or unsubstituted $C_7$-$C_{40}$ alkylaryl,
Z is —O—or substituted or unsubstituted —(—O—$C_{1-20}$—)$_w$—O—, wherein w is 1 to 20,
Ar is a $C_6$-$C_{62}$ aromatic group; m is 0-3 and n is 3-6; and
each Y is independently $C_1$-$C_{20}$ alkyl, substituted $C_1$-$C_{20}$ alkyl, $C_6$-$C_{20}$ aryl, $C_1$-$C_8$ alkyl- substituted $C_6$-$C_{20}$ aryl, halogen, nitro, $C_1$-$C_{20}$ alkoxycarbonyl, $C_1$-$C_{20}$ alkoxy, or $C_1$-$C_{20}$ acyl; and
a ionizing radiation stabilizing additive,
wherein the amount of aromatic sulfonate compound is based on the total weight of the polycarbonate and the aromatic sulfonate compound.

17. A method of making a thermoplastic composition comprising melt-blending:
a polycarbonate, and
an aromatic sulfonate compound of formula

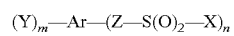

wherein
each X is independently a substituted or unsubstituted $C_1$-$C_{20}$ alkyl, substituted or unsubstituted $C_1$-$C_{20}$ arylalkyl, substituted or unsubstituted $C_6$-$C_{20}$ aryl, or substituted or unsubstituted $C_7$-$C_{40}$ alkylaryl,
Z is —O—or substituted or unsubstituted —(—O—$C_{1-20}$—)$_w$—O—, wherein w is 1 to 20,
Ar is a $C_6$-$C_{62}$ aromatic group; m is 0-3 and n is 3-6; and
each Y is independently $C_1$-$C_{20}$ alkyl, substituted $C_1$-$C_{20}$ alkyl, $C_6$-$C_{20}$ aryl, $C_1$-$C_8$ alkyl- substituted $C_6$-$C_{20}$ aryl, halogen, nitro, $C_1$-$C_{20}$ alkoxycarbonyl, $C_1$-$C_{20}$ alkoxy, or $C_1$-$C_{20}$ acyl, and
a ionizing radiation stabilizing additive,
wherein a molded article having a thickness of 3.2±0.12 millimeters and consisting of the polycarbonate, the aromatic sulfonate compound, and an effective amount of each of a mold-release agent and an antioxidant has, after exposure to a total gamma radiation dose of 83 kGy and when measured according to ASTM D1925-70, an increase in yellowness index (dYI) of less than or equal to 45, when compared to the unexposed molded article.

18. A masterbatch composition comprising:
a polycarbonate, and
5 to 500 mmol/Kg of an aromatic sulfonate compound of formula

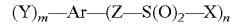

wherein
each X is independently a substituted or unsubstituted $C_1$-$C_{20}$ alkyl, substituted or unsubstituted $C_1$-$C_{20}$ arylalkyl, substituted or unsubstituted $C_6$-$C_{20}$ aryl, or substituted or unsubstituted $C_7$-$C_{40}$ alkylaryl,
Z is —O—or substituted or unsubstituted —(—O—$C_{1-20}$—)$_w$—O—, wherein w is 1 to 20,
Ar is a $C_6$-$C_{62}$ aromatic group; m is 0-3 and n is 3-6; and
each Y is independently $C_1$-$C_{20}$ alkyl, substituted $C_1$-$C_{20}$ alkyl, $C_6$-$C_{20}$ aryl, $C_1$-$C_8$ alkyl- substituted $C_6$-$C_{20}$ aryl, halogen, nitro, $C_1$-$C_{20}$ alkoxycarbonyl, $C_1$-$C_{20}$ alkoxy, or $C_1$-$C_{20}$ acyl, and
a ionizing radiation stabilizing additive, wherein the amount of aromatic sulfonate compound is based on the total weight of the polycarbonate and the aromatic sulfonate compound, and wherein a thermoplastic composition comprises the masterbatch composition and a polycarbonate resin.

19. A method of making a thermoplastic composition comprising melt-blending:
a masterbatch composition comprising:
  a polycarbonate, and
  an aromatic sulfonate compound of formula

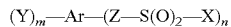

wherein
  each X is independently a substituted or unsubstituted $C_1$-$C_{20}$ alkyl, substituted or unsubstituted $C_1$-$C_{20}$ aryalkyl, substituted or unsubstituted $C_6$-$C_{20}$ aryl, or substituted or unsubstituted $C_7$-$C_{40}$ alkylaryl,
  Z is —O— or substituted or unsubstituted —(—O—$C_{1-20}$—)$_w$—O—, wherein w is 1 to 20,
  Ar is a $C_6$-$C_{62}$ aromatic group; m is 0-3 and n is 3-6; and
  each Y is independently $C_1$-$C_{20}$ alkyl, substituted $C_1$-$C_{20}$ alkyl, $C_6$-$C_{20}$ aryl, $C_1$-$C_8$ alkyl- substituted $C_6$-$C_{20}$ aryl, halogen, nitro, $C_1$-$C_{20}$ alkoxycarbonyl, $C_1$-$C_{20}$ alkoxy, or $C_1$-$C_{20}$ acyl;
  a polycarbonate resin; and
  a ionizing radiation stabilizing additive,
  wherein a molded article having a thickness of 3.2±0.12 millimeters and consisting of the polycarbonate, the aromatic sulfonate compound, the polycarbonate resin, and an effective amount of each of a mold-release agent and an antioxidant has, after exposure to a total gamma radiation dose of 83 kGy and when measured according to ASTM D1925-70, an increase in yellowness index (dYI) of less than or equal to 45, when compared to the unexposed molded article.

20. An article comprising the thermoplastic composition of claim 1.

21. The article of claim 20, wherein the article has a thickness of 3.2±0.12 millimeters and a transmission of greater than 95% according to ASTM D1003-00, and wherein these properties are maintained after gamma irradiation at a total dose of up to 83 kGy.

22. The thermoplastic composition of claim 1, wherein each Y is independently fluoro, chloro, bromo, iodo, methoxy carbonyl, ethyl carbonyl, t-butyl carbonyl, cyclohexyl carbonyl, phenyl carbonyl, —OCH$_3$, —OCH$_2$CH$_3$, —O-t-butyl, —O-n-butyl, —O-n-octyl, acetyl, pivaloyl, n-octyloyl, n-dodecoyl, n-stearoyl, benzoyl, methyl, ethyl, propyl, isopropyl, butyl, sec-butyl, tert-butyl, n-pentyl, 2-pentyl, 3-pentyl, isopentyl, neopentyl, hexyl, heptyl, octyl, nonyl, decyl, dodecyl, octadecyl, cyclopropyl, cyclobutyl, cyclopentyl, cyclohexyl, cyclohexyl, adamantyl, norbornyl, phenyl, $C_1$-$C_8$ alkylphenyl, $C_1$-$C_8$ alkoxyphenyl, or halophenyl.

23. The thermoplastic composition of claim 1, wherein each Z is independently oxygen diradical, ethanedioxy, 1,2-propanedioxy, 1,3-propanedioxy, 1,2- butanedioxy, 1,3-butanedioxy, 1,4-butanedioxy, 2,3-butanedioxy, 1,2-pentanedioxy, 1,3- pentanedioxy, 1,4-pentanedioxy, 1,5-pentanedioxy, 2,3-pentanedioxy, 2,4-pentanedioxy, 2-methy1-1,2-butanedioxy, 2-methyl-1,3-butanedioxy, 2-methyl-1,4-butanedioxy, 2-methy1-2,3- butanedioxy, 2,2-dimethyl- 1,2-propanedioxy, 2,2-dimethyl-1,3-propanedioxy, 3,3-dimethy1-1,2-propanedioxy, 1,1-dimethyl-2,3-propanedioxy, 1,2-hexanedioxy, 1,3-hexanedioxy, 1,4- hexanedioxy, 1,5-hexanedioxy, 1,6-hexanedioxy, 2,3-hexanedioxy, 2,4-hexanedioxy, 2,5- hexanedioxy, 2-methyl-1,2-pentanedioxy, 2-methyl-1,3-pentanedioxy, 2-methyl-1,4-pentanedioxy, 2-methyl-2,3-pentanedioxy, 2-methyl-2,4-pentanedioxy, 2,2-dimethy1-1,2- butanedioxy, 2,2-dimethyl-1,3-butanedioxy, 3,3-dimethyl- 1,2-butanedioxy, 1,1-dimethy1-2,3- butanedioxy, octanedioxy, decanedioxy, undecanedioxy, dodecanedioxy, hexadecanedioxy, octadecanedioxy, icosanedioxy, docosananedioxy, cyclopropanedioxy, cyclobutanedioxy, cyclopentanedioxy, cyclohexanedioxy, 1,4-dioxymethyl cyclohexane, ethylenedioxy, 1,2- propylenedioxy, 1,3-propylenedioxy, 1,2-butylenedioxy, 1,4-butylenedioxy, or 1,6-hexylenedioxy.

24. The thermoplastic composition of claim 1, wherein each X is independently methyl, ethyl, n-propyl, 2-methylpropyl, n-butyl, 2-methylbutyl, 3-methylbutyl, n-pentyl, 2-methylpentyl, 3-methylpentyl, 4-methylpentyl, n-hexyl, cyclohexyl, n-octyl, 2- ethylhexyl, n-dodecyl, n-octadecyl n-eicosyl, camphoryl, trifluoromethyl, 2,2,2-trifluoroethyl, perfluoroethyl, perfluoro-n-butyl, perfluoro-n-hexyl, perfluoro-n-octyl, perfluorocyclohexyl, perfluoro-(4-ethylcyclohexyl)-2-ethyl, benzyl, 2-methylbenzyl, 3-methylbenzyl, 4-methylbenzyl, phenyl, 2-methylphenyl, 3-methylphenyl, 4-methylphenyl, 3,5-dimethylphenyl, 2,3- dimethylphenyl, 2,4-dimethylphenyl, 2,5-dimethylphenyl, 2,6-dimethylphenyl, 2,3,4- trimethylphenyl, 2,3,5-trimethylphenyl, 3,4,5-trimethylphenyl, 2,4,6-trimethylphenyl, 4- ethylphenyl, 4-n-butylphenyl, 4-tert-butylphenyl, 2-trifluoromethylphenyl, 4-trifluoromethylphenyl, 4-methoxyphenyl, 4-tert-butoxyphenyl, 4-fluorophenyl, 4-chlorophenyl, 4-bromophenyl, naphthyl, $C_1$-$C_8$ alkyl-substituted naphthyl, $C_1$-$C_8$ alkyl ether-substituted naphthyl, or halogen-substituted naphthyl.

* * * * *